United States Patent
Mori et al.

[19]

[11] Patent Number: 5,954,565
[45] Date of Patent: *Sep. 21, 1999

[54] ROLLING MILL EQUIPPED WITH ON-LINE ROLL GRINDING SYSTEM AND GRINDING WHEEL

[75] Inventors: Shigeru Mori; Shigetoshi Kondoh; Tadashi Nishino; Yasutsugu Yoshimura; Yasuharu Imagawa; Hiroyuki Shiraiwa, all of Hitachi, Japan

[73] Assignee: Hitachi Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/590,672

[22] Filed: Jan. 24, 1996

Related U.S. Application Data

[62] Division of application No. 08/070,760, Jun. 3, 1993, Pat. No. 5,562,525.

[30] Foreign Application Priority Data

Jun. 3, 1992 [JP] Japan ................................ 4-142971
Aug. 11, 1992 [JP] Japan ................................ 4-214151

[51] Int. Cl.⁶ .................................................... B24B 5/37
[52] U.S. Cl. .............................. 451/5; 451/425; 451/49
[58] Field of Search .................... 451/5, 49, 424, 451/425, 548, 160

[56] References Cited

U.S. PATENT DOCUMENTS

| | | | |
|---|---|---|---|
| 2,612,736 | 10/1952 | Lewis | 451/548 |
| 2,697,900 | 12/1954 | Lewis | 451/49 |
| 3,290,834 | 12/1966 | Lindblad | 451/528 |
| 4,619,080 | 10/1986 | Okamoto et al. | 451/424 |
| 4,716,687 | 1/1988 | Tsukamoto et al. | 451/49 |
| 4,809,467 | 3/1989 | De Fazio | |
| 4,882,878 | 11/1989 | Benner | |

FOREIGN PATENT DOCUMENTS

| | | |
|---|---|---|
| 0397 993 A2 | 11/1990 | European Pat. Off. |
| 3 416186 | 1/1985 | Germany |
| 3416186A1 | 1/1985 | Germany |
| 257213 | 1/1988 | Germany |
| 257 213 A5 | 6/1988 | Germany |
| 4105079A1 | 10/1991 | Germany |
| 58-28705 | 8/1956 | Japan |
| 58-28706 | 8/1956 | Japan |
| 5828705 | 8/1956 | Japan |
| 5828706 | 8/1956 | Japan |
| 58-189006 | of 1983 | Japan |
| 58-028705 | 1/1983 | Japan |
| 61-24711 | 10/1986 | Japan |
| 62-095867 | 1/1987 | Japan |
| 62-95867 | 6/1987 | Japan |
| 3234472 | 10/1991 | Japan |
| 4-41008 | of 1992 | Japan |
| 487766 | 3/1992 | Japan |
| 4201171 | 7/1992 | Japan |
| 55358 | 1/1993 | Japan |
| 463529 | 4/1937 | United Kingdom |

OTHER PUBLICATIONS

Japanese Office Action and translation dated Mar. 25, 1997 in related Japanese application. Cited references were previously submitted in previous Information Disclosure Statement.

Opposition Against European Patent No. 0 573 035 and English translation thereof dated Feb. 11, 1998.

*Primary Examiner*—Robert A. Rose
*Attorney, Agent, or Firm*—Evenson McKeown Edwards & Lenahan PLLC

[57] ABSTRACT

A grinding head unit is constituted by a grinding wheel, a drive device for rotating the grinding wheel, and a movement device for moving the grinding wheel. When vibration of a mill roll is applied to the grinding wheel, a plain wheel integral with an abrasive layer of the grinding wheel and having an elastically deforming function is deflected to absorb the vibration energy. The contact force between the abrasive layer and the mill roll is measured for determining a profile of the mill roll. The mill roll can be thereby ground into a target profile while absorbing the vibration transmitted from the mill roll and measuring the profile of the mill roll, without causing any chattering marks.

14 Claims, 29 Drawing Sheets

ROLLING MILL EQUIPPED WITH ON-LINE ROLL GRINDING SYSTEM AND GRINDING WHEEL

This is a divisional application of application Ser. No. 08/070,760, filed Jun. 3, 1993, now U.S. Pat. No. 5,562,525.

BACKGROUND OF THE INVENTION

The present invention relates to a rolling mill equipped with an on-line roll grinding system, and more particularly to an on-line roll grinding system for effectively grinding mill rolls on-line without undergoing influences of vibration of work rolls.

Generally, when slabs are rolled by work rolls of a strip rolling mill, there occurs a periphery difference between the rolling zone and the unrolling zone because only the former is abraded or worn away. This imposes such restrictions upon the rolling operation as necessity of rolling slabs in order of wide ones to narrow ones. To solve that problem, there have been proposed various techniques and control methods in relation to on-line roll grinders.

For example, "Development of On-Line Roll Grinders", Mitsubishi Giho, Vol. 25, No. 4, 1988, discloses a technique that a plurality of cup grinding stones are arranged along one work roll and mounted to a one-piece frame, the frame being always moved in its entirety over a certain range, and the cup grinding stones are not positively driven to rotate but passively driven with the aid of torque of the work roll, thereby grinding the entire surface of the work roll (hereinafter referred to as first prior art).

Also, JP, U, 58-28705 discloses a technique that one roll grinding unit is disposed for one work roll, contact rolls serving as position sensors are held in contact with neck portions at both ends of the work roll on the side thereof opposite to the roll grinding unit, the position sensors detecting an offset of the work roll, and a shifting device is controlled to move a grinding wheel following the detected offset (hereinafter referred to as second prior art).

Further, "On-Line Constant Pressure Grinding for Work Rolls", Proceedings of 1992 Spring Lecture Meeting of Precision Engineering Society of Japan, reports an experimental result of forming an abrasive layer of a cup grinding stone using abrasives of cubic boron nitride (CBN), arranging a spindle of the grinding stone perpendicularly to the axis of a work roll, and grinding the work roll (hereinafter referred to as third prior art).

In addition, JP, U, 58-28706 and JP, U, 62-95867 disclose a technique that a cup grinding stone arranged substantially perpendicular to a work roll is mounted to a spindle slidably in its axial direction, and the grinding stone is axially supported at its backside by an elastic body directly or via a boss, thereby absorbing vibration of the work roll (hereinafter referred to as fourth prior art).

Meanwhile, in strip rolling machines, it has been conventionally proposed to measure the profile of a work roll and control the crown and shape of a strip by utilizing the measured profile. As a technique for measuring the profile of the work roll, an on-line roll profile meter has been developed which employs a ultrasonic profile meter. The system configuration of this profile meter is described in "Development of On-Line Roll Grinding System with Profile Meter", Mitsubishi Giho, Vol. 29, No. 1, 1992. In this system, a column of water is produced between a probe with a ultrasonic profile meter built therein and a work roll, and the spacing from the probe to the work roll is determined based on the time required for pulsatory ultrasonic waves emitted from the probe to reciprocate between the probe and the surface of the work roll (hereinafter referred to as fifth prior art).

SUMMARY OF THE INVENTION

Work rolls of a rolling mill are each held by bearings assembled in metal chocks and rotated at a high speed. The metal chocks each have gaps in its inner and outer circumferences for facilitating replacement of the work roll and the bearing. During rotation, therefore, the work roll is rotated while moving back and forth in the gaps. In addition, since a cylindrical portion of the work roll undergoes an offset with respect to the bearings, the work roll is vertically moved by a screwdown device during strip rolling. As a result of those movements combined with each other, the work roll is rotated while vibrating at all times.

Generally, when grinding cylindrical works, the work to be ground is supported by a tail stock rotating with high precision to carry out the grinding under a condition that vibration of the work is suppressed to be as small as practicable. In an attempt to grind the work roll while rolling a strip in the rolling mill, however, it is impossible to carry out the grinding under a condition of very small vibration like works in the above ordinary case. During the rolling, the work roll is rotated while vibrating usually with an amplitude of 20 $\mu$m to 60 $\mu$m and an acceleration of 1G to 2G. An on-line roll grinding system must precisely grind the work roll under such a condition.

With the above first to third prior arts, when they are applied to the grinding of such a vibrating work roll, there produce irregularities on the surface of the work roll due to chattering marks. Also., the grinding stone or wheel is remarkably worn away with the impact force caused by chattering, and its service life is so shortened as to require more frequent replacement. Further, it is difficult to control the contact force in the case of grinding the work roll into a predetermined profile.

The above fourth prior art is designed to absorb the vibration of the work roll by the elastic body. With this prior art, however, since the entire grinding stone including a stone base is supported by the elastic body and moved back and forth, there accompanies a problem that the movable mass of the grinding stone, i.e., the weight of a portion which is forced to move following the vibration, is great. Even in the case of using, as the abrasive layer of the grinding stone, abrasives of cubic boron nitride (CBN) which has a high grinding ratio, the movable mass of the grinding stone supported by the elastic body and moving back and forth is at least more than 5 Kg, including the stone itself of which diameter is assumed to be 250 mm, slide bearings and sealing parts. Supposing that an allowable value of change in the contact force between the work roll and the grinding stone is 4 Kgf and the amplitude of vibration of the work roll is 30 $\mu$m, the spring constant of the elastic body must be set to 130 Kgf/mm. Under the above conditions, the natural frequency of the movable portion including the elastic body is calculated to be 80 c/s. The movable portion including the elastic body, which has such a low natural frequency, is caused to resonate with the vibration of the work roll, thereby producing chattering marks on the roll surface and accelerating abrasion of the grinding stone. If the stone size is reduced to make the movable mass smaller, the grinding ability would be lowered to a large extent.

The cup grinding stone is slidable in the axial direction of the spindle and supported at its backside by the elastic body.

During the roll grinding, however, a coolant, grinding dust and the like are scattered around the grinding stone, and these foreign matters may enter clearances between the grinding stone and the spindle to impede smooth movement of the grinding stone. It is therefore difficult for the elastic body to stably develop its function for a long period of time.

The above first and second prior arts also have the following problem. The unrolling zone of the work roll is not subjected to abrasion by the strip and hence should be ground to a larger extent than the rolling zone. With the above first embodiment, however, because the circumferential speed of the cup grinding stone is limited by the rotational speed of the work roll, the grinding rate can be controlled only by changing the contact force in the case of grinding the unrolling zone to a larger extent. This imposes a limitation upon the grinding rate, making it difficult to keep a constant roll profile for a long period of time.

With the above second embodiment, since the spindle is arranged perpendicularly to the work roll, the abrasive layer of the grinding wheel contacts the work roll at two right and left points of its annular abrasives surface and the work roll is simultaneously ground at those two points. Therefore, if the work roll has a periphery difference, the two grinding surfaces interfere with each other to cause chattering marks. Also, the contact at two points between the grinding wheel and the work roll leads to a difficulty in controlling the contact force therebetween. Additionally, the position sensors have a problem of reliability under severe environment of rolling machines. From these reasons, the above second embodiment has not yet been put into practice.

Measurement of a roll profile will now be considered. After a strip is rolled by work rolls, the work rolls are each worn away about 2 $\mu$m/radius per coil of a hot rolling steel strip, for example, in the zone where the strip is rolled. Due to this wear and the thermal crown resulted from an increase in the roll diameter caused by the heat of the strip, the profile of the roll surface is changed over the entire length of a roll barrel. If the roll profile can be correctly measured, the on-line roll grinder provided in the rolling mill can grind the work roll into the roll profile optimum for the rolling. Heretofore, it has been regarded to be difficult to correctly measure the roll profile of the work roll, which is vibrating and sprayed with a large amount of roll coolant at all times, in the rolling mill, i.e., on-line.

As known from the above fifth prior art, there has been developed an on-line profile meter of the type that a column of water is produced between a probe and a work roll for determining the spacing from the probe to the work roll based on the time required for ultrasonic waves to reciprocate between the probe and the surface of the work roll. However, because of measuring the time during which ultrasonic waves reciprocate through the very short distance, the measure time is also very short and the profile distance is on the order of microns. There is hence a fear that even a small error of the measured time may result in a large profile error. Particularly, in the case of using the ultrasonic profile meter for a long period of time, even if the state of the column of water between the probe and the roll is so changed as to cause an error in the measurement, it is difficult to find such an error. Although the ultrasonic profile meter can always correctly measure the roll profile in principles, there is a difficulty in maintaining high precision at all times in practice when the ultrasonic profile meter is used for a long period of time under the severe environment as mentioned above. The presence of plural measuring probes also makes it difficult to perform compensation.

A first object of the present invention is to provide a rolling mill equipped with an on-line roll grinding system and a grinding wheel for the on-line roll grinding system in which vibration from a work roll is absorbed to enable precise grinding with good roughness of the roll surface without giving rise to any chattering marks.

A second object of the present invention is to provide a rolling mill equipped with an on-line roll grinding system and a grinding wheel for the on-line roll grinding system in which the profile of a work roll can be correctly measured by a roll profile meter provided integrally with the on-line roll grinding system.

To achieve the above first object, in accordance with the present invention, there is provided a rolling mill equipped with an on-line roll grinding system comprising a plain type grinding wheel positioned to face one of a pair of mill rolls for grinding one said mill roll, grinding wheel drive means for rotating said grinding wheel through a spindle, grinding wheel movement means for pressing said grinding wheel against said mill roll, and grinding wheel traverse means for moving said grinding wheel in the axial direction of said mill roll, wherein said grinding wheel comprises a plain wheel attached to said spindle and an abrasive layer fixed to one side of said plain wheel, said plain wheel having an elastically deforming function to absorb vibration transmitted from said mill roll.

In the above on-line roll grinding system, preferably, said grinding wheel is arranged such that a contact line between said abrasive layer and said mill roll is defined only in one side as viewed from the center of said grinding wheel, and more preferably, said grinding wheel is arranged with said spindle inclined by a small angle relative to the direction perpendicular to an axis of said mill roll, so that a contact line between said abrasive layer and said mill roll is defined only in one side in the roll axial direction as viewed from the center of said grinding wheel.

Preferably, said abrasive layer is annular in shape, and said abrasive layer contains super abrasives, i.e., cubic boron nitride abrasives and/or diamond abrasives.

Also, said plain wheel preferably has a spring constant of 1000 Kgf/mm to 30 Kgf/mm, and more preferably a spring constant of 500 Kgf/mm to 50 Kgf/mm.

Preferably, said abrasive layer contains cubic boron nitride abrasives, said abrasives having a concentration of 50 to 100 and a grain size of 80 to 180, and a resin bond is used as a binder for said abrasives.

Preferably, said on-line roll grinding system further comprises load detecting means for measuring the contact force between said grinding wheel and said mill roll, and control means for controlling said grinding wheel movement means to optionally change the contact force measured by said load detecting means so that a grinding rate of said grinding wheel on said mill roll is changed, for thereby grinding said mill roll into a predetermined roll profile.

Said on-line roll grinding system may further comprise load detecting means for measuring the contact force between said grinding wheel and said mill roll, and control means for controlling said grinding wheel movement means so that the contact force measured by said load detecting means is held constant, and for simultaneously controlling said grinding wheel traverse means to optionally change a traverse speed of said grinding wheel in the roll axial direction so that a grinding rate of said grinding wheel on said mill roll is changed, for thereby grinding said mill roll into a predetermined roll profile.

Preferably, said grinding wheel movement means comprises a rotation drive source, and a ball screw mechanism or a gear mechanism having a small backlash and converting rotation of said rotation drive source into axial movement of said grinding wheel movement means for moving said grinding wheel back and forth relative to said mill roll.

Preferably, said on-line roll grinding system comprises at least two grinding head units for each of said mill rolls, each of said two grinding head units including said grinding wheel, said grinding wheel drive means, said grinding wheel movement means and said grinding wheel traverse means, whereby said two grinding head units can grind said mill roll independently of each other.

In this case, said on-line roll grinding system preferably further comprises control means for stopping said grinding wheel traverse means of two said grinding head units at different positions so that a grinding overlap zone produced when grinding said mill roll by said two grinding head units is distributed in the roll axial direction.

Preferably, said grinding wheels of two said grinding head units are arranged with respective spindles inclined by a small angle in opposite directions relative to the direction perpendicular to an axis of said mill roll, so that respective contact lines between said abrasive layers and said mill roll are each defined only in one corresponding roll end side in the roll axial direction as viewed from the center of said grinding wheel.

To achieve the above second object, in accordance with the present invention, there is provided a rolling mill equipped with an on-line roll grinding system, wherein said on-line roll grinding system further comprises displacement detector means for measuring a stroke of said grinding wheel in the roll axial direction given by said grinding wheel traverse means, load detecting means for measuring the contact force between said grinding wheel and said mill roll, and an on-line profile meter including first profile calculating means for calculating a profile of said mill roll from both the contact force measured by said load detecting means and the stroke measured by said displacement detector means under a condion of keeping a stroke of said grinding wheel movement means constant.

Also, to achieve the above second object, in accordance with the present invention, there is provided a rolling mill equipped with an on-line roll grinding system, wherein said on-line roll grinding system further comprises first displacement detector means for measuring a stroke of said grinding wheel movement means, second displacement detector means for measuring a stroke of said grinding wheel in the roll axial direction given by said grinding wheel traverse means, load detecting means for measuring the contact force between said grinding wheel and said mill roll, and an on-line profile meter including second profile calculating means for calculating a profile of said mill roll from both the stroke measured by said first displacement detector means and the stroke measured by said second displasemsent detector means under a condition of keeping the contact force measured by said load detecting means constant.

In the above on-line roll grinding system, said on-line profile meter preferably further includes means for calculating a deviation of a profile of said mill roll measured by an off-line profile meter from the profile of said mill roll determined by said first or second profile calculating means, determining from said deviation an error in parallelism of the direction of movement of said grinding wheel by said grinding wheel traverse means with respect to said mill roll, and compensating the roll profile determined by said first or second profile calculating means based on the determined error in parallelism.

Preferably, said on-line profile meter further includes means for calculating a deviation of the profile of said mill roll determined by said first or second profile calculating means from a preset target roll profile, and controlling at least one of said grinding wheel movement means and said grinding wheel traverse means based on the calculated deviation so that a grinding rate of said grinding wheel on said mill roll is changed, for thereby grinding said mill roll to be identical with said target roll profile.

In this case, said control means preferably controls said grinding wheel movement means to optionally change the contact force measured by said load detecting means for thereby changing said grinding rate.

Alternatively, said control means may control said grinding wheel movement means so that the contact force measured by said load detecting means is held constant and, simultaneously, controls said grinding wheel traverse means to optionally change a traverse speed of said grinding wheel in the roll axial direction for thereby changing said grinding rate.

Also, said rolling mill preferably further comprises at least one of roll bender means for applying bender forces to said mill roll, roll shifting means for shifting said mill roll in the axial direction and roll crossing means for making said pair of mill rolls crossed each other, and control means for controlling at least one of the bender forces of said roll bender means, a shift position set by said roll shifting means and a cross angle set by said roll crossing means based on the profile of said mill roll measured by said first or second profile calculating means so that the strip crown approaches a target strip crown.

Further, in said rolling mill, said on-line roll grinding system preferably further comprises control means for measuring an inclination of the axis of said mill roll and controlling said grinding wheel movement means and said grinding wheel traverse means so that said grinding wheel moves following a target roll profile in consideration of the inclination of the axis of said mill roll. In this case, preferably, said on-line roll grinding system further comprises presser means for fixing metal chocks supporting both ends of said mill roll, and holding the inclination of the axis of said mill roll constant during the grinding.

In the above on-line roll grinding system, preferably, said grinding wheel, said grinding wheel drive means, said grinding wheel movement means and said grinding wheel traverse means constitute one grinding head unit, and said on-line roll grinding system further comprises a reference small-diameter zone formed on at least one end of said mill roll and having a known diameter smaller than the diameter of a roll barrel, and a displacement meter provided on said grinding head unit for measuring a distance from said grinding head unit to said mill roll.

In the above rolling mill, preferably, said mill roll is a work roll, and said grinding wheel, said grinding wheel drive means, said grinding wheel movement means and said grinding wheel traverse means constitute a grinding head unit for grinding said work roll. Alternatively, said mill roll is a backup roll, and said grinding wheel, said grinding wheel drive means, said grinding wheel movement means and said grinding wheel traverse means constitute a grinding head unit for grinding said backup roll.

Preferably, said on-line roll grinding system further comprises a reference small-diameter zone formed on at least one end of said mill roll and having a known diameter smaller than the diameter of a roll barrel, and roll diameter calculating means for pressing said grinding wheel against said mill roll at respective positions in said reference small-diameter zone and said roll barrel such that the contact force between said grinding wheel and said mill roll has the same value, determining a periphery difference between said reference small-diameter zone and said roll barrel from a difference in displacement of said grinding wheel at that time, and determining a roll diameter in said roll barrel from the determined periphery difference and the known roll diameter in said reference small-diameter zone.

Furthermore, to achieve the above first and second objects, in accordance with the present invention, there is provided a grinding wheel for an on-line roll grinding system comprising a plain wheel and an abrasive layer fixed to one side of said plain wheel and formed of super abrasives, said plain wheel having an elastically deforming function to absorb vibration transmitted from a mill roll.

Operation of the present invention thus constructed is as follows.

First, in the present invention, with an elastically deforming function imparted to the plain wheel as a part of the plain type grinding wheel, when the grinding wheel is pushed upon vibration of the mill roll, the plain wheel is deflected to momentarily absorb the vibration transmitted from the mill roll. Accordingly, fluctuations in the contact force between the abrasive layer and the mill roll are held down within a small range of the elastic force fluctuating upon the deflection of the plain wheel, thereby eliminating the occurrence of chattering marks. Further, an elastically deforming function is imparted to the plain wheel serving as a base for supporting the abrasive layer so that the abrasive layer is integral with a member having the elastically deforming function. Therefore, only both the abrasive layer and the plain wheel provide the mass forced to move upon the vibration from the mill roll, whereby the movable mass can be very small and the natural frequency of the grinding wheel can be raised. Consequently, the vibrating mill roll can be correctly ground for a long period of time without causing any chattering marks due to resonance.

With the grinding wheel arranged such that the contact line between the abrasive layer and the mill roll is defined only in one side as viewed from the center of the grinding wheel, the plain wheel is allowed to deflect in cantilever fashion when pressed against the mill roll, whereby the elastically deforming function of the plain wheel is effectively developed to easily absorb the vibration transmitted from the mill roll. Further, since the contact line is defined in only one side of the wheel center, the occurrence of chattering marks is prevented and contact force control (described later) can be performed properly.

With the abrasive layers formed of super abrasive grains, particularly, cubic boron nitride abrasives or diamond abrasives, the grinding wheel has a grinding ratio more than 100 times that of the grinding wheel made of aluminum oxide ($Al_2O_3$) abrasives or silicon carbide (SiC) abrasives, resulting in that the grinding can be continued for a long period of time with a small weight of the grinding wheel. Consequently, the movable mass of the grinding wheel is further reduced, which is effective in preventing resonance during the grinding, reducing the exchange pitch of the grinding wheel, and improving productivity of the rolling mill.

As to the spring constant of the plain wheel, if the spring constant is too large, the chattering marks are caused, the grinding ratio is lowered, and further the abrasive layer is soon worn away thoroughly. Also, if the spring constant of the plain wheel is too large, the contact force between the abrasive layer and the mill roll is so largely fluctuated as to impose a difficulty in controlling the grinding rate due to the contact force. Through the studies conducted by the inventors, it has been found that by setting the spring constant of the plain wheel to be not larger than 1000 Kgf/mm, preferably 500 Kgf/mm, it is possible to prevent the abrasive layer from being soon worn away thoroughly, and use the grinding wheel continuously for not less than 5 days once exchanged.

On the contrary, if the spring constant is small, the contact force imposed on the grinding wheel due to the vibration of the mill roll is less fluctuated. The grinding ratio is therefore raised, but sensitivity of detecting the contact force is lowered and accuracy of grinding control and roll profile measurement both based on the contact force is degraded. Also, the smaller spring constant of the plain wheel means that the plain wheel is thinner and the grinding wheel is deflected to a larger extent with the same contact force, causing cracks in the plain wheel even with the contact force necessary for the grinding. Through the studies conducted by the inventors, it has been found that by setting the spring constant of the plain wheel to be not less than 30 Kgf/mm, the plain wheel can be prevented from cracking, and by setting the spring constant to be not less than 50 Kgf/mm, even load fluctuations generated with a periphery difference of 10 $\mu$m can be detected.

As to compositions of the abrasive layer, in order to keep the grinding ability constant and stabilize the grinding roughness without dressing in on-line roll grinding, it is required for the super abrasive grains of the abrasive layer to be spontaneously edged at a constant rate. Proper spontaneous edging of the super abrasive grains needs adjustment of the load imposed on one super abrasive grain. Through the studies conducted by the inventors, it has been found that by setting density, i.e., concentration, of the super abrasive grains contained in the abrasive layer within the range of 50 to 100 and using a resin bond as a binder, the super abrasive grains are easily spontaneously edged, the service life of the abrasive layer is not shortened, and hence continuous grinding is enabled without dressing. It has been also found that the size of the super abrasive grains, i.e., the grain size, is required to be in the range of 80 to 180 for obtaining the surface roughness of the mill roll in the range of 0.3 to 1.5 $\mu$m in average.

By continuously measuring the contact force between the mill roll and the grinding wheel and then changing the contact force, the grinding rate of the grinding wheel on the mill roll per unit time is changed. Thus, by measuring the contact force at all times and controlling the position of the grinding wheel by the grinding wheel movement means so that the contact force is held constant, the mill roll can be ground by the same dimension all over its cylindrical barrel. In other words, it is possible to grind the enter length of the mill roll while maintaining its original profile.

Also, by controlling the contact force in such a manner as to increased and decrease, the mill roll can be ground into an arbitrary roll profile. Further, by optionally controlling the traverse speed of the grinding wheel in the roll axial direction while controlling the contact force to be kept constant, the mill roll can also be ground into an arbitrary roll profile.

Unless the grinding wheel movement means for pressing the grinding wheel against the mill roll is constituted by using a mechanism having a high spring constant, there may cause chattering marks. As grinding wheel movement means which is compact and has a high spring constant, optimum one is a mechanism in which a baklashless pre-loaded ball screw is driven by an electric motor. This mechanism is also able to hold the position of the grinding wheel constant during the grinding and to finely move the grinding wheel back and forth.

When the grinding wheel is moved in the roll axial direction for grinding the mill roll, it is required to grind the unrolling zone to a larger extent than the rolling zone for eliminating a periphery difference between the unrolling zone and the rolling zone. The unrolling zone exists at each of both ends of the mill roll. In view of that, a plurality of grinding head units each including the grinding wheel, the grinding wheel drive means, the grinding wheel movement means and the grinding wheel traverse means are disposed to be movable independently of each other. Normally, two units are moved to remain in the respective unrolling zones at both roll ends for grinding them. Once per several times, the grinding head units are moved to the rolling zone of the mill roll for grinding a fatigue layer on the surface therein. Thus, corresponding to wear of the rolling zone caused by rolling a strip, the unrolling zones are ground by the grinding wheel so that the roll profile free from a periphery difference can be maintained.

When a plurality of grinding head units are arranged to be movable independently of each oter for grinding a mill roll, there occurs an overlap zone on the mill roll where the roll surfaces ground by adjacent grinding wheels overlap with each oter. The grinding wheel traverse means are stopped at different positions so that the overlap zone will not always produce at the same posision, thereby distributing the overlap position.

As mentioned above, by making the contact line between the grinding wheel and the mill roll defined at one point, it is possible to carry out satisfactory grinding under constant conditions. In the present invention, therefore, the spindle of the grinding wheel is inclined by a small angle relative to a line perpendicular to the axis of the mill roll. By so arranging, in the on-line roll grinding system having a plurality of grinding wheels, there may occur an interference between the end of the grinding wheel and a housing if the spindles are inclined in the same direction at both ends of the mill roll. Such an interference in the grinding can be avoided by arranging the spindles of the grinding head units positioned at both ends of the mill roll to be inclined in opposite directions. Accordingly, the grinding wheels can be freely moved to the respective ends of the mill roll, and there is no need of particularly considering the dimension between the roll end and the housing.

Further, in the on-line profile meter having the first profile calculating means of the present invention, the grinding wheel is pressed by the grinding wheel movement means against the rotating mill roll to deflect the plain wheel in a certain amount, following which the grinding wheel movement means is stopped and the contact force between the mill roll and the grinding wheel at that time is measured by the load detecting means. Then, while moving the grinding wheel by the grinding wheel traverse means in the axial direction of the mill roll, the stroke (axial position) of the grinding wheel is measured by the displacement detector means and the contact force is measured by the load detecting means.

Since the abrasive layer of the grinding wheel is supported by the plain wheel having an elastically deforming function and the plain wheel has a fixed spring constant, the larger contact force increases a deflection of the plain wheel. Conversely, the smaller contact force reduces a deflection of the plain wheel. On the other hand, if the axis of the mill roll and the on-line roll grinding system or the grinding head units are parallel to each other, the plain wheel of the grinding wheel is deflected to a larger extent with a larger diameter of the mill roll and to a smaller extent with a smaller diameter of the mill roll on condition that the grinding wheel movement means is kept fixed.

In the first profile calculating means, therefore, the deflection of the plain wheel is determined from the value (contact force) measured by the load detecting means and processed to be correspondent to respective positions in the roll axial direction, thereby obtaining a profile of the mill roll.

Moreover, in the on-line profile meter having the second profile calculating means of the present invention, the grinding wheel is pressed by the grinding wheel movement means against the rotating mill roll to deflect the plain wheel in a certain amount, and then the grinding wheel movement means is controlled so that the deflection of the plain wheel (i.e., the contact force) is always held constant. While measuring the stroke of the grinding wheel in the axial direction of its spindle by the first displacement detector means, the grinding wheel is moved in the roll axial direction by the grinding wheel traverse means and the stroke (axial position) of the grinding wheel is measured by the second displacement detector means. Thus, in the second profile calculating means, the stroke of the grinding wheel in the axial direction of its spindle is determined from the measured value of the first displacement detector means and processed to be correspondent to respective positions in the roll axial direction, thereby obtaining a profile of the mill roll.

The on-line roll grinding system is initially installed such that the direction of traverse movement along the roll axial direction is in parallel to the axis of the mill roll. But, there is a fear in hot rolling mills that parallelism between them may change for a long period of time due to the heat of strips. Unless such a change in parallelism is compensated, the roll profile measured as mentioned above cannot be said as a true profile. The compensation means provided in the on-line profile meter compensates the error in parallelism and enables the more precise profile measurement.

More specifically, a mill roll is ground by an off-line roll grinder installed in a roll shop, and its roll profile after the grinding is measured by an off-line roll profile meter. After assembling the mill roll into the rolling mill, a profile of the mill roll is measured by using the first or second profile calculating means of the on-line roll profile meter. Then, a deviation (difference) between both the profile values measured by the off-line and on-line roll profile meters is determined and, from this determined deviation, an error in parallelism of the on-line roll grinding system or the grinding head units with respect to the roll axial direction is determined. Since then, at the time of measuring a profile of the mill roll by using the first or second profile calculating means, the above error in parallelism is subtracted from the measured values obtained as mentioned above, thereby compensating the measured values to determine the correct measured values.

In the control means for grinding the mill roll to be identical with a target roll profile, after determining a profile of the mill roll by the first or second profile calculating means, a deviation of the determined profile of the mill roll from a preset target roll profile is calculated. The grinding wheel movement means is controlled such that the grinding wheel is pressed against the mill roll by a stronger force in the roll radial direction (at the roll axial position) in which the above deviation is large, thereby controlling the grinding rate on the mill roll so that the mill roll is ground into the target roll profile. Alternatively, while controlling the contact force between the mill roll and the grinding wheel to be held constant, the traverse speed of the grinding wheel in the roll axial direction may be changed to vary the grinding rate on the mill roll. In this case, too, the mill roll is ground into the target roll profile.

After determining a profile of the mill roll by the first or second profile calculating means, the determined data is input to a system computer for controlling the entire rolling mill and, based on the input data, roll benders provided in the rolling mill is operated to apply bending forces to the mill rolls, thereby improving the profile of a hot strip. When the rolling mill has roll shifting means for shifting the mill roll in the axial direction or roll crossing means for making the mill rolls crossed each other, the profile of a hot strip may be improved by controlling such means. By so using the measured roll profile as control data for the roll benders, the roll shifting means or the roll crossing means, high-accurate strip crown control is enabled.

By moving the grinding head unit in the roll axial direction while keeping the distance between the axis of the mill roll and the distal end surface of the abrasive layer constant, the mill roll is ground to have the same diameter over its entire length. By moving the grinding head unit in such a manner as to optionally change the distance between the axis of the mill roll and the distal end surface of the abrasive layer, the contact force between the mill roll and the grinding wheel is increased at the position providing the shorter distance where the mill roll is ground to a larger extent. On the contrary, the contact force between the mill roll and the grinding wheel is decreased at the position providing the longer distance where the mill roll is ground to a smaller extent. Thus, for optionally creating and maintaining a profile of the mill roll, the grinding wheel movement means is moved to control the distance between the axis of the mill roll and the distal end surface of the abrasive layer such that the distal end surface of the abrasive layer draws the same path as the target roll profile of the mill roll.

By measuring an inclination of the axis of the mill roll and grinding the mill roll while controlling the grinding wheel movement means and the grinding wheel traverse means such that the distal end surface of the abrasive layer moves along the target roll profile of the mill roll in consideration of the inclination, even if the axis of the mill roll is inclined, the correct roll profile compensated for the inclination can be always maintained.

When the work rolls is continuously ground for a long period of time, there may occur a difference in diameter between the upper and lower rolls, i.e., a diameter difference. If such a diameter difference is increased, values of rolling torque necessary for the upper and lower rolls become so different as to impose undue forces on the spindles and so forth, which may result in a trouble. To prevent such a trouble, the system is usually controlled so that the diameter difference is kept within 0.2 mm/diameter.

By forming a reference small-diameter zone having a known roll diameter in at least one end of the mill roll, and measuring a periphery difference between the reference small-diameter zone and the roll barrel by a displacement meter, the correct roll diameter can be always determined. By making such measurement on the upper and lower rolls, the diameter reference can be monitored on-line.

Also, by measuring the roll diameter at both ends of the mill roll, whether the mill roll is tapered or not in the roll axial direction after the grinding (i.e., cylindricity) can be confirmed.

Further, by pressing the grinding wheel against the mill roll at respective positions in the reference small-diameter zone and the roll barrel zone so that the contact force between the grinding wheel and the mill roll has the same value, and determining a periphery difference between the reference small-diameter zone and the roll barrel from the difference between two strokes of the grinding wheel measured at the respective positions at that time, the roll diameter can be measured without using any displacement meter.

In hot rolling mills, while work rolls are worn away due to contact with hot strips, backup rolls supporting the work rolls also develop a fatigue layer on their roll surfaces because the backup rolls are contacted with the work rolls under high contact forces. By providing the on-line roll grinding system on each of the backup rolls as well, the fatigue layer on the backup roll surfaces can be easily removed.

DETAILED DESCRIPTION OF THE PREFERRED EMBODIMENTS

Preferred embodiments of the present invention will be described hereinafter with reference to the drawings.

First Embodiment

At the outset, a description will be given of a first embodiment of the present invention by referring to FIGS. 1 to 21.

Figure 1:
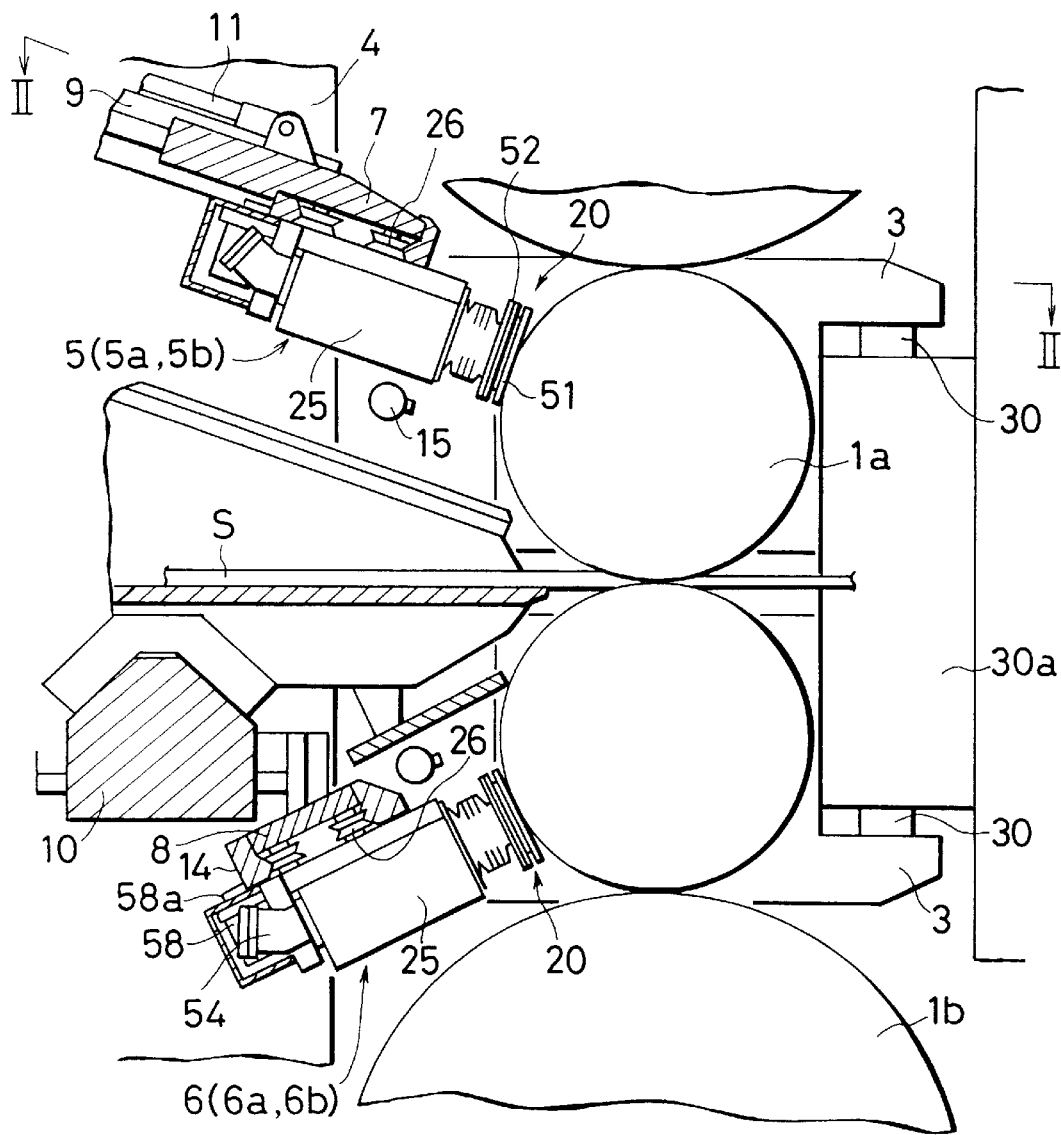
FIG. 1 is a side view, partially sectioned, of principal parts of a rolling mill equipped with an on-line roll grinding system according to a first embodiment of the present invention.
Figure 2:
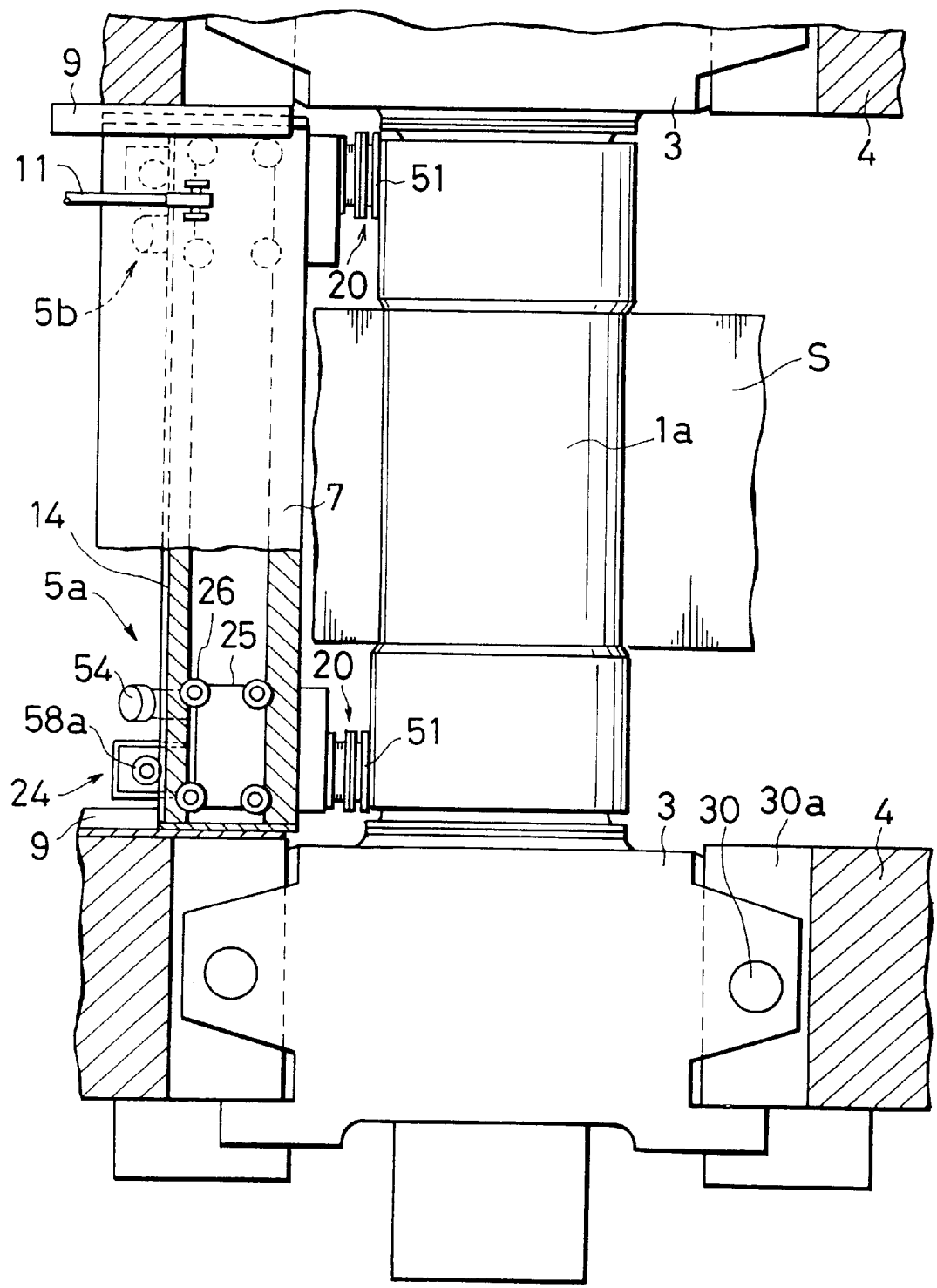
FIG. 2 is a sectional view, partially cut away, taken along line II—II in FIG. 1.

In FIGS. 1 and 2, a rolling mill of this embodiment is of a 4 high rolling mill comprising a pair of rolls (upper and lower work rolls) 1a, 1a for rolling a strip S, a pair of rolls (upper and lower backup rolls) 1b, 1b for respectively supporting the work rolls 1a, 1a, and a pair of roll benders 30, 30 for respectively allowing the work rolls 1a, 1a to deflect. The work rolls 1a, 1a are supported by metal chocks 3, 3 which are assembled into respective stands 4 on the operating and drive sides. An entry guide 10 is disposed on the entry side of the rolling mill for guiding the strip S to the work rolls 1a. There are also provided coolant headers 15, 15 for cooling heat of the work rolls 1a, 1a generated during the rolling.

Such a rolling mill is equipped with an on-line roll grinding system of this embodiment. The on-line roll grinding system comprises two upper grinding head units 5a, 5b (hereinafter represented by "5" in the description common to 5a and 5b) for the lower work roll 1a and two lower grinding head units 6a, 6b (hereinafter similarly represented by "6" with only one of them being shown in FIG. 1) for the upper work roll 1a.

Figure 3:
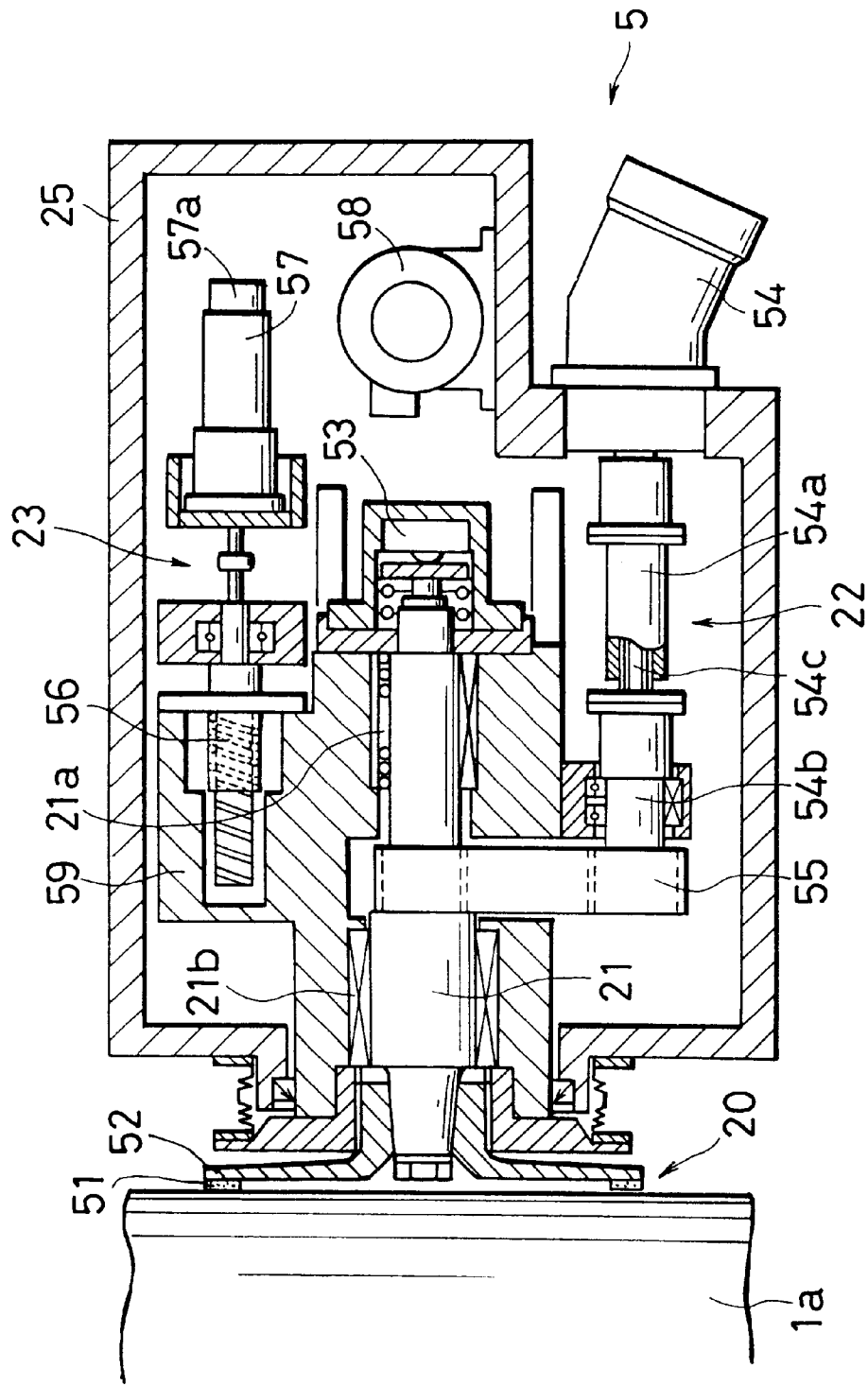
FIG. 3 is a transverse sectional view of a roll grinding unit.
Figure 4:
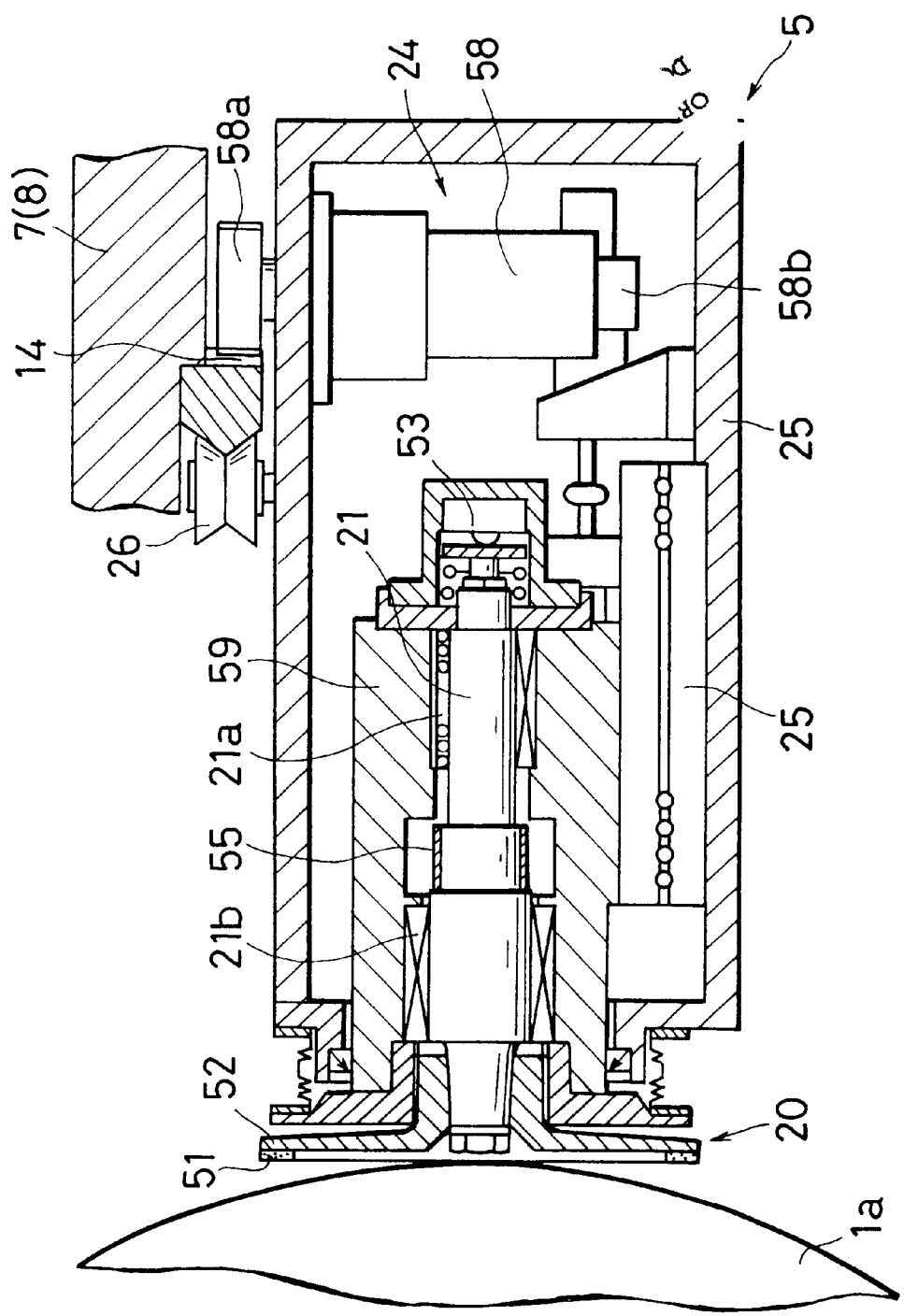
FIG. 4 is a vertical sectional view of the roll grinding unit.

The upper grinding head units 5a, 5b are disposed corresponding to the operating and drive sides of the work roll 1a, respectively, and can be operated to grind the work roll independently of each other. Likewise, the lower grinding head units 6a, 6b are disposed corresponding to the operating and drive sides of the work roll 1a, respectively, and can be operated to grind the work roll independently of each other. These units 5a, 5b and 6a, 6b each comprise, as shown in FIGS. 3 and 4, a plain type grinding wheel 20 for grinding the work roll 1a, a grinding wheel drive device 22 for rotating the grinding wheel 20 through a spindle 21, a grinding wheel movement device 23 for pressing the grinding wheel 20 against the work roll 1a, and a grinding wheel traverse device 24 for moving the grinding wheel 20 in the axial direction of the work roll 1a.

Figure 5:
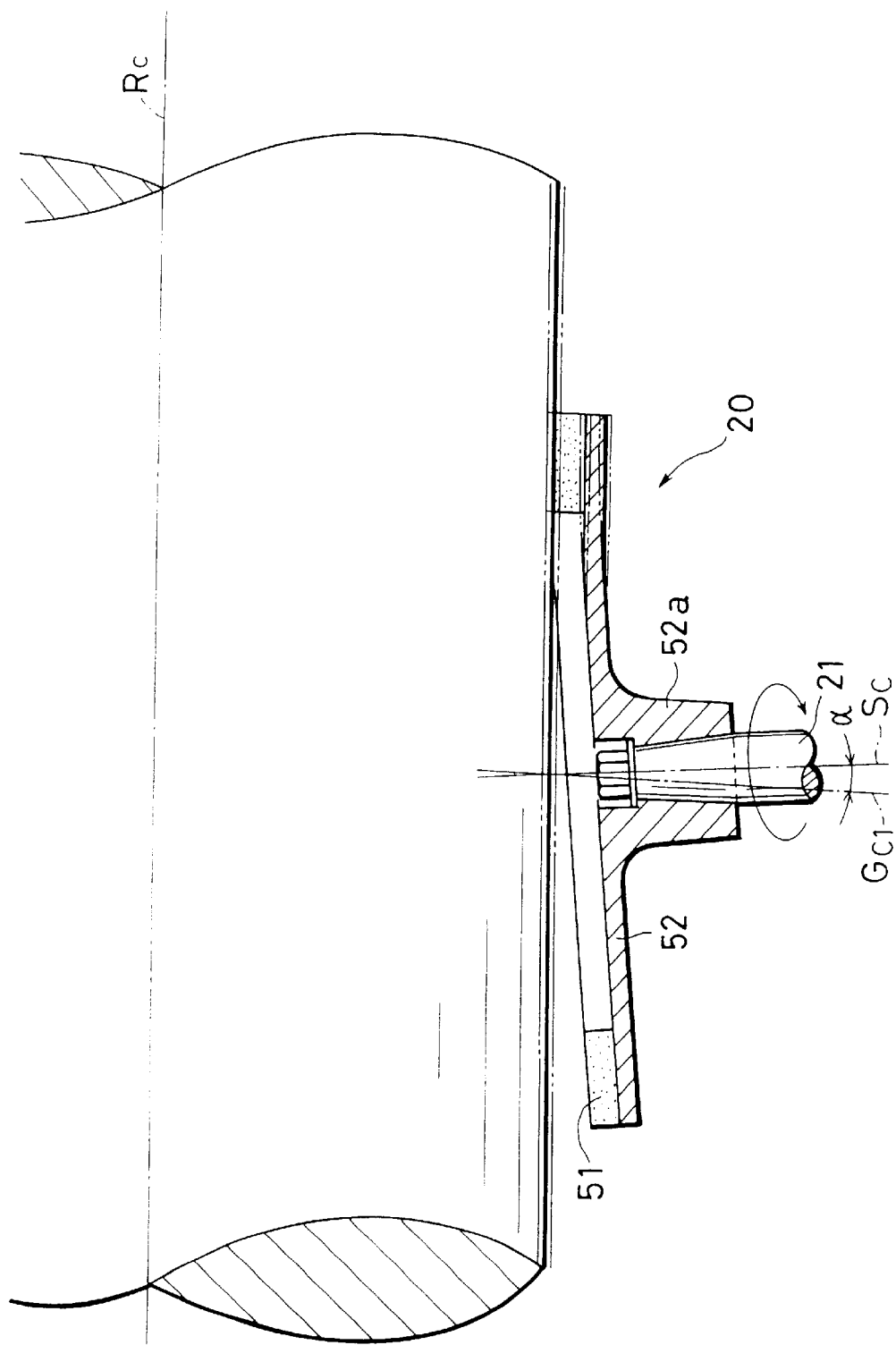
FIG. 5 is a representation showing arrangement and structure of a grinding wheel and for explaining a vibration absorbing action of the grinding wheel.

As shown in FIG. 5 in an enlarged scale, the grinding wheel 20 comprises a plain wheel 52 having a boss 52a and an annular abrasive layer 51 fixed to the surface of the plain wheel 52 on the side opposite to the boss 52a, the plain wheel 52 being attached to the spindle 21. Also, the plain wheel 52 has an elastically deforming function to absorb vibration from the work roll, and is structured such that its deflection is changed depending on the contact force between the work roll 1a and the abrasive layer 51. For the purpose of developing the elastically deforming function, the plain wheel 52 preferably has a spring constant of 1000 Kgf/mm to 30 Kgf/mm, more preferably 500 Kgf/mm to 50 Kgf/mm. The abrasive layer 51 is attached integrally with the plain wheel 52 by an adhesive so that it can be stably brought into close contact with the vibrating work roll 1a.

The abrasive layer 51 is formed of super abrasive grains such as cubic boron nitride (generally called CBN) abrasives or diamond abrasives. The abrasive grains have a concentration in the range of 50 to 100 and a grain size of in the range of 80 to 180. The abrasive grains are aggregated together by using a resin bond as a binder. Material of the plain wheel 52 is of aluminum or an aluminum alloy for the purpose of easily radiating the grinding heat from the abrasive grains of the abrasive layer 51 and reducing movable mass of the grinding wheel 20.

As shown in FIG. 5, the grinding wheel 20 is arranged such that an axis Gcl of the spindle 21 is inclined by a small angle of α relative to a line Sc perpendicular to an axis Rc of the work roll 1a, and a contact line between the abrasive layer 51 and the work roll 1a is defined only in one side as viewed from the center of the grinding wheel. The angle of inclination α is preferably on the order of 0.5° to 1.0°. Such an arrangement of the grinding wheel 20 makes it possible to effectively develop the elastically deforming function of the plain wheel 52, and to properly control the contact force between the grinding wheel and the work roll (as described later).

Figure 6:
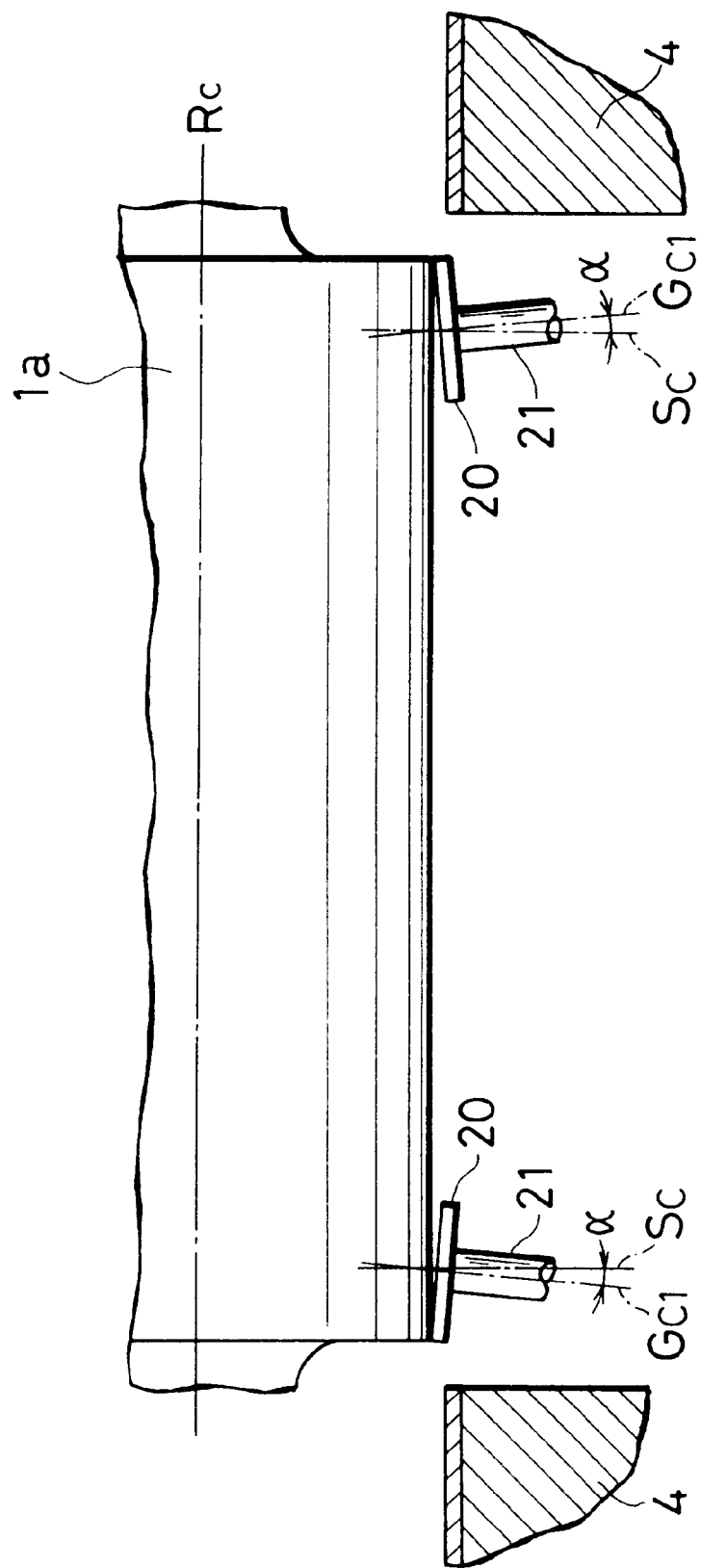
FIG. 6 is a representation showing the relationship in arrangement between the grinding wheels of the two roll grinding units.

Also, the grinding wheel 20 of the grinding head unit 5a and the grinding wheel 20 of the grinding head unit 5b are arranged, as shown in FIG. 6, such that respective axes Gc1 of their spindles 21 are inclined by the small angle of α in opposite directions relative to respective lines Sc perpendicular to the axis Rc of the work roll 1a, and respective contact lines between the abrasive layers 51 and the work roll 1a are each defined only in one corresponding roll end side as viewed from the center of the grinding wheel. Such an arrangement equally applies to the grinding wheel 20 of the grinding head unit 6a and the grinding wheel 20 of the grinding head unit 6b. This enables the grinding to be carried out to the opposite ends of the work roll 1a without interfering with the stands (as described later).

The grinding wheel drive device 22 comprises, as shown in FIG. 3, a liquid motor 54 (which may be instead of an electric motor) for driving the grinding wheel 20 to rotate at a predetermined circumferential speed, and a pulley shaft 54b and a belt 55 for transmitting rotation of an output shaft 54a of the liquid motor 54 to the spindle 21, the output shaft 54a and the pulley shaft 54b being coupled with each other through parallel splines 54c. The pulley shaft 54b is rotatably supported by a body 59. The spindle 21 is supported in the body 59 through a pair of slide radial bearings 21a, 21b in a rotatable and axially movable manner. On the side of the spindle 21 opposite to the grinding wheel 20, a load cell 53 is accommodated in the body 59 for measuring the contact force between the grinding wheel 20 and the work roll 1a.

The body 59 is housed in a case 25 and the liquid motor 54 is attached to the case 25. As shown in FIG. 4, the body 59 is mounted onto the bottom of the case 25 through a slide bearing 25a to be movable in the axial direction of the spindle 21.

The grinding wheel movement device 23 comprises, as shown in FIG. 3, a movement motor 57 attached to the case 25, a backlashless pre-loaded ball screw 56 for moving the body 59 upon rotation of the movement motor 57 in the direction toward or away from the work roll 1a to thereby shift the grinding wheel 20, the spindle 21 and the load cell 53 together back and forth, and an encoder 57a for detecting an angle through which the movement motor 57 is rotated. The pre-loaded ball screw 56 may be replaced by a backlashless gear mechanism.

The grinding wheel traverse device 24 comprises, as shown in FIG. 4, a traverse motor 58 attached to the case 25, a pinion 58a fitted over a rotary shaft of the traverse motor 58 and held in mesh with a rack 14, two pairs of guide rollers 26 attached to an upper surface of the case 25 and engaging an upper or lower traverse rail 7, 8, and an encoder 58b for detecting the number of revolutions of the traverse motor 58. As shown in FIGS. 1 and 2, the traverse rails 7, 8 are extended on the entry side of the work rolls 1a, 1a in parallel to the axes of the work rolls, and the rack 14 is formed on the side of the traverse rail 7 or 8 opposite to the work roll. Thus, the grinding head units 5, 6 are each smoothly movable in the axial direction of the work roll upon rotation of the traverse motor 58 through meshing between the pinion 58a and the rack 14, while being supported by the traverse rail 7, 8 via the guide rollers 26.

The grinding head units 5, 6 are each required to not interfere with the metal chocks 3 when the corresponding work roll 1a is exchanged. Therefore, the upper traverse rail 7 is slidably supported at its both ends on guides 9 attached to the stand 4, so that the grinding head units 5a, 5b are moved rearwardly along with the traverse rail 8 through a cylinder 11 and the guides 9. Also, the lower traverse rail 8 is supported at its both ends by entry side guides 10 so that the grinding head unit 6 is moved rearwardly along with the corresponding entry side guide 10 upon operation of a drive device (not shown).

Figure 7:
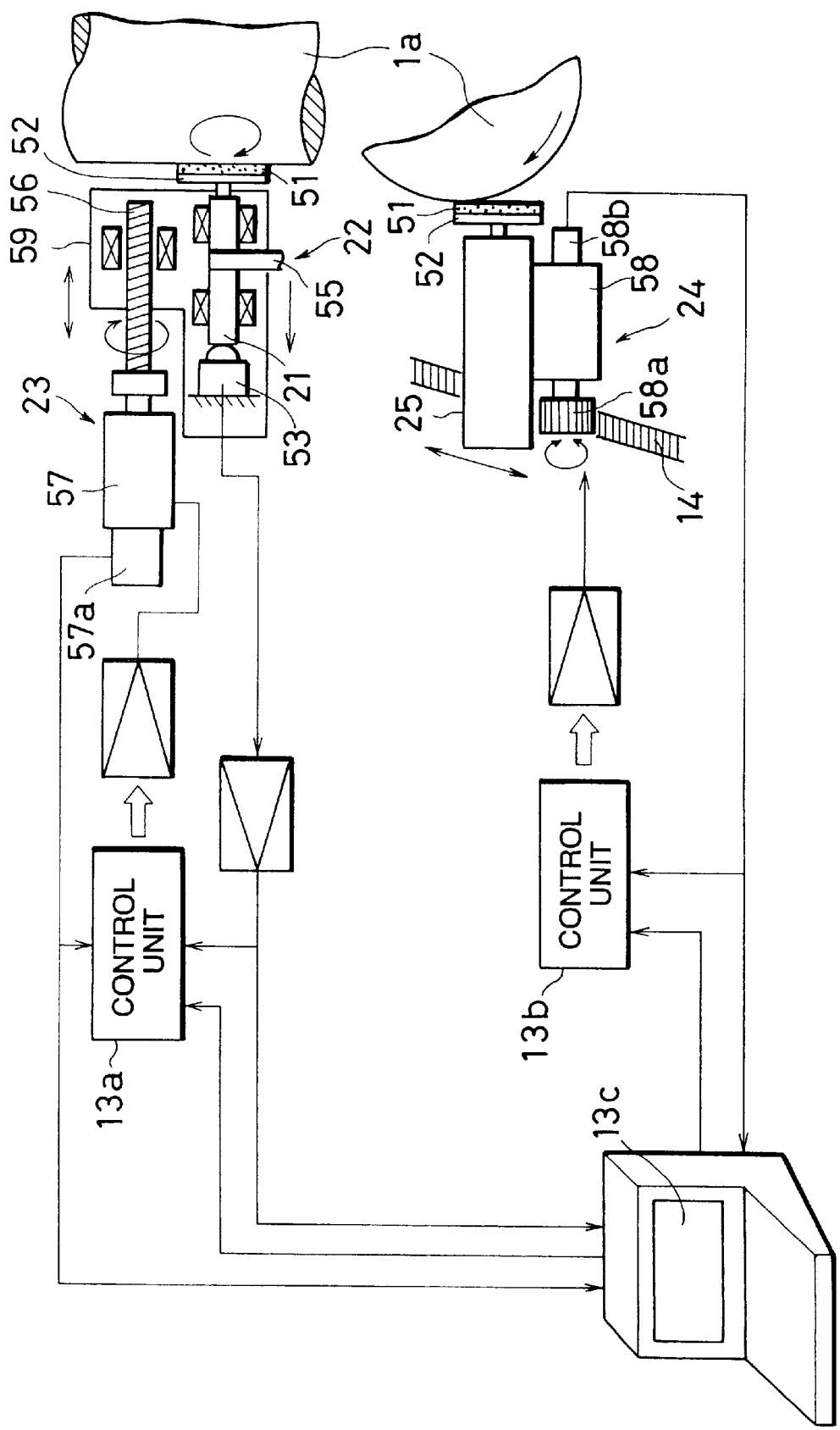
FIG. 7 is a diagram for explaining a control system of the roll grinding unit.

In each of the grinding head units 5, 6, as shown in FIG. 7, the movement motor 57 of the grinding wheel movement device 23, and the traverse motor 58 of the grinding wheel traverse device 24 are controlled by control units 13a, 13b, respectively. Also, detected signals from the load cell 53, the encoder 57a of the grinding wheel movement device 23, and the encoder 58b of the grinding wheel traverse device 24 are transmitted to a computer 13c and then processed. The computer 13c has various processing functions and transmits signals resulted from the processing to the control units 13a, 13b for controlling the movement motor 57 and the traverse motor 58. The processing functions of the computer 13c will be described later.

Operation and control of the on-line roll grinding system of this embodiment will now be described.

A description will first be given of basic operation of the on-line roll grinding system of this embodiment.

The work roll 1a is rotated while vibrating at a frequency of 10 to 150 c/s depending on the rolling speed. When a roll grinder having a cylindrical grinding stone, which has been conventional in off-line grinding systems, is employed in on-line grinding systems, the cylindrical grinding stone and the work roll contact with each other through abrasives on the stone surface so that the work roll is ground by mutual collision of the metal on the roll surface and the abrasives.

Figure 8:
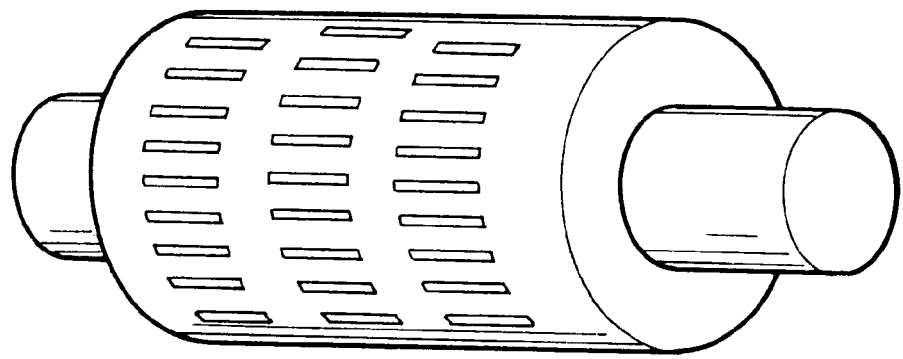
FIG. 8 is a representation showing scratches produced on the surface a work roll by chattering.
Figure 9:
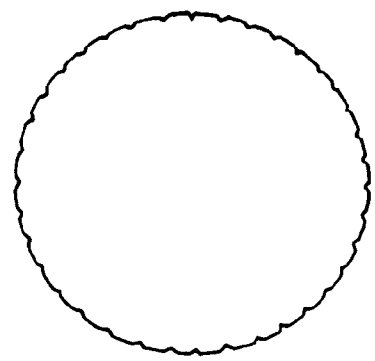
FIG. 9 is a representation showing a sectional configuration of the work roll shown in FIG. 8.

Stated otherwise, the work roll is ground at the time the abrasives come into contact with the metal on the roll surface, but the grinding stone departs away from the work roll at a next moment, causing the abrasives to rotate while beating the air. With such discontinuous grinding, there occurs chattering to render the roll surface and the roll section irregular as shown in FIGS. 8 and 9, respectively.

If a grinding wheel or stone is vibrated at the same frequency of the work roll, no changes are caused in the contact force between the grinding wheel and the work roll. Because of the work roll vibrating at a high frequency of 150 c/s, however, it is difficult to make the grinding wheel, including its entire frame, follow the work roll, i.e., to vibrate the former in tune with the latter. In view of the above, if the grinding wheel itself is given with an elastically deforming function to absorb the vibration through deflection thereof, rather than escaping the vibration through the grinding wheel and its entire frame, the movable mass is so reduced as to smoothly follow the vibration of the work roll, whereby fluctuations in the contact force between the grinding wheel and the work roll become small.

In this embodiment, such an elastically deforming function is imparted to the grinding wheel itself by causing the plain wheel 52 as a part of the grinding wheel 20 to have an elastically deforming function. More specifically, the grinding wheel 20 is deflected by being pressed against the rotating work roll 1a, while it is being rotated at a circumferential speed of 1000 m/min to 1600 m/min of the abrasive layer 51 measured at its outer periphery. During the grinding, the work roll 1a is vibrating back and forth, as explained above. The grinding wheel 20 is pushed by this vibration, but at this time the plain wheel 52 is deflected, as shown in FIG. 5, to momentarily absorb the vibration transmitted from the work roll 1a. Accordingly, fluctuations in the contact force between the abrasive layer 51 and the work roll 1a are held down within a small range of the elastic force fluctuating upon the deflection of the plain wheel 52, thereby eliminating the occurrence of chattering marks.

In addition, for a cylindrical grinding stone, it is difficult to give the grinding stone itself with an elastically deforming function because the work roll and a spindle of the grinding stone are arranged in parallel to each other. For a plain grinding wheel, however, an elastically deforming function can be easily imparted to the grinding wheel itself because the work roll and the spindle of the grinding wheel are arranged in substantially orthogonal relation. For this reason, using a plain grinding wheel is more effective to grind the vibrating work roll.

Thus, in this embodiment, an elastically deforming function is imparted to the plain wheel 52 as a base of the abrasive layer 51. Also, to effectively develop the elastically deforming function, the grinding wheel 20 is arranged such that the contact line between the abrasive layer 51 and the work roll 1a is defined only in one side as viewed from the center of the grinding wheel, as shown in FIG. 5. This arrangement allows the plain wheel 52 to deflect in cantilever fashion when pressed against the work roll 1a, thereby absorbing the vibration transmitted from the work roll 1a.

Figure 10:
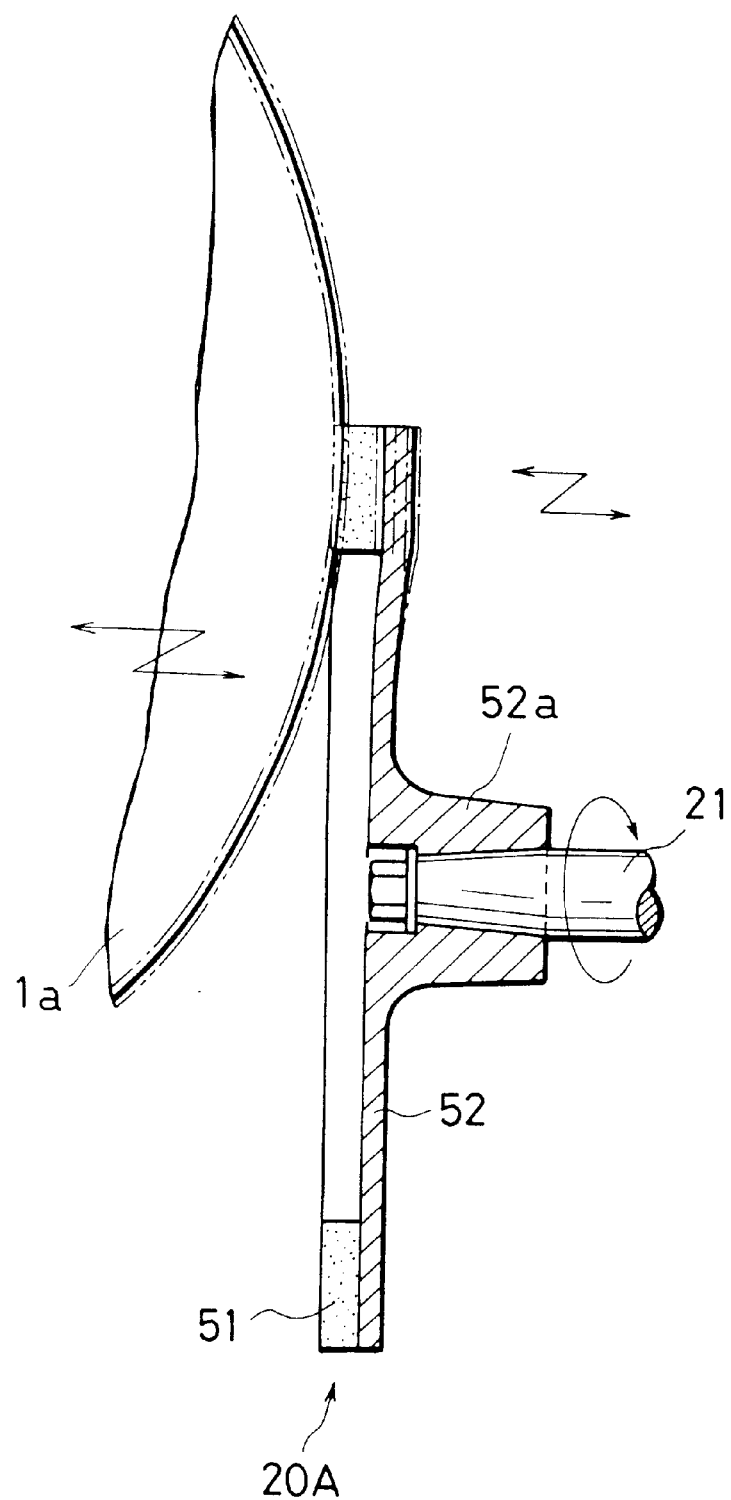
FIG. 10 is a representation showing another example of arrangement of the grinding wheel and for explaining a vibration absorbing action of the grinding wheel.

For enabling the plain wheel 52 to deflect, a grinding wheel 20A may be arranged such that its spindle 21 has an axis offset from the axis of the work roll 1a, as shown in FIG. 10. Furthermore, because of the abrasive layer 51 being annular in shape, even when the grinding wheel 20 is pressed against the work roll 1a in parallel thereto, the grinding wheel contacts the work roll at two points of the abrasive layer 51 on both sides of the wheel center and the plain wheel 52 can deflect. In this case, however, since the plain wheel 52 is supported at two opposite ends, it is less deflected. By contacting the plain wheel 52 with the work roll at one point as with this embodiment, a larger deflection can be obtained by using a plain wheel of the same diameter.

A grinding wheel has an allowable range of the contact force between the work roll and the grinding wheel depending on the grinding ability of abrasives. In the case of imparting an elastically deforming function to the grinding wheel itself, the following condition must be satisfied in order that the contact force is properly held in the allowable range and the grinding wheel will not resonate even under vibration of the work roll.

$$F \geq K \times Amax$$

where F: allowable range of the contact force
Amax: one-side amplitude of vibration of work roll
K: spring constant of elastic body (plain wheel)
Thus, $$K \leq F/Amax$$

Therefore, if an elastic body of the grinding wheel itself has a spring constant smaller than the above spring constant K determined from the allowable range F of the contact force between the grinding wheel and the work roll and the one-side amplitude Amax of vibration of the work roll, the grinding wheel can grind the work roll while following the latter at all times.

On the other hand, if the natural frequency of the grinding wheel coincides with the vibration frequency of the work roll, the grinding wheel is caused to resonate and hence can no longer grind the work roll precisely. For this reason, the natural frequency of the grinding wheel is preferably set to be as far as possible from the vibration frequency of the work roll.

$$Fn > Frmax$$

where Fn: natural frequency of the grinding wheel

Frmax: maximum number of vibration frequency of the work roll

Meanwhile, the natural frequency of the grinding wheel is expressed by:

$$Fn = \frac{1}{2\pi}\sqrt{K/M}$$

where M: mass of the grinding wheel including the elastic body (i.e., movable mass) Accordingly, in an attempt to raise the natural frequency of the grinding wheel, it is required to increase the spring constant K of the elastic body, or reduce the mass M of the grinding wheel including the elastic body. But, as mentioned above, the spring constant K of the elastic body cannot be set larger than a certain value (F/Amax). To raise the natural frequency of the grinding wheel, therefore, the mass of the grinding wheel including the elastic body must be reduced.

On condition of F=4 Kgf and Mmax=30 $\mu$m, for example, K=133 Kgf/mm is resulted: Assuming that there hold Frmax=150 c/s and Fn=400 c/s, therefore, the movable mass M including the grinding wheel must be held down to 0.2 Kg.

For the grinding wheel made of abrasive grains of aluminum oxide ($Al_2O_3$) or silicon carbide (SiC) which are generally used in grinding wheels or stones, if the movable mass is held down to 0.2 Kg, the grinding wheel is soon worn away thoroughly and must be exchanged may times per day. This greatly lessens the effect of grinding the work roll in the rolling mill, i.e., on-line.

To solve that problem, it is needed to use a grinding wheel with a high grinding ratio (the volume of the work reduced/the volume of the grinding wheel reduced).

When the grinding wheel is made of abrasive grains of aluminum oxide ($Al_2O_3$) or silicon carbide (SiC) which are generally used at the present, it is difficult to increase the grinding ratio more than 3 in the case of grinding a hard work roll. In contrast, the grinding wheel 20 of this embodiment, which is made of super abrasive grains such as cubic boron nitride (generally called CBN) abrasives or diamond abrasives, has a grinding ratio above 300 even in grinding the work roll 1a, and hence exhibits a grinding ratio more than 100 times that of the grinding wheel made of aluminum oxide ($Al_2O_3$) abrasives or silicon carbide (SiC) abrasives. By employing the above super abrasive grains in the grinding wheel of the on-line roll grinding system so as to advantageously utilize such a high grinding ratio of the super abrasive grains, the grinding can be continued for a long period of time with a small weight of the grinding wheel.

Further, in this embodiment, the abrasive layer 51 is attached to the base in the form of the plain wheel 52, and an elastically deforming function is imparted to the plain wheel 52, so that the abrasive layer 51 is integral with a member having the elastically deforming function. Therefore, only both the abrasive layer 51 and the plain wheel 52 provide the mass forced to move upon the vibration from the work roll 1a. Consequently, the movable mass can be very small and the natural frequency of the grinding wheel 20 can be raised.

As mentioned above, with this embodiment, the abrasive layer 52 is formed of super abrasive grains having a high grinding ratio (which enable the grinding wheel to have a light weight and a long service life) for achieving the small movable mass, and the grinding wheel 20 made integral with the plain wheel 52 having a proper spring constant is pressed against work roll 1a while it is rotating. As a result, it is possible to correctly grind the vibrating work roll for a long period of time without causing chattering marks due to resonance.

Figure 11:
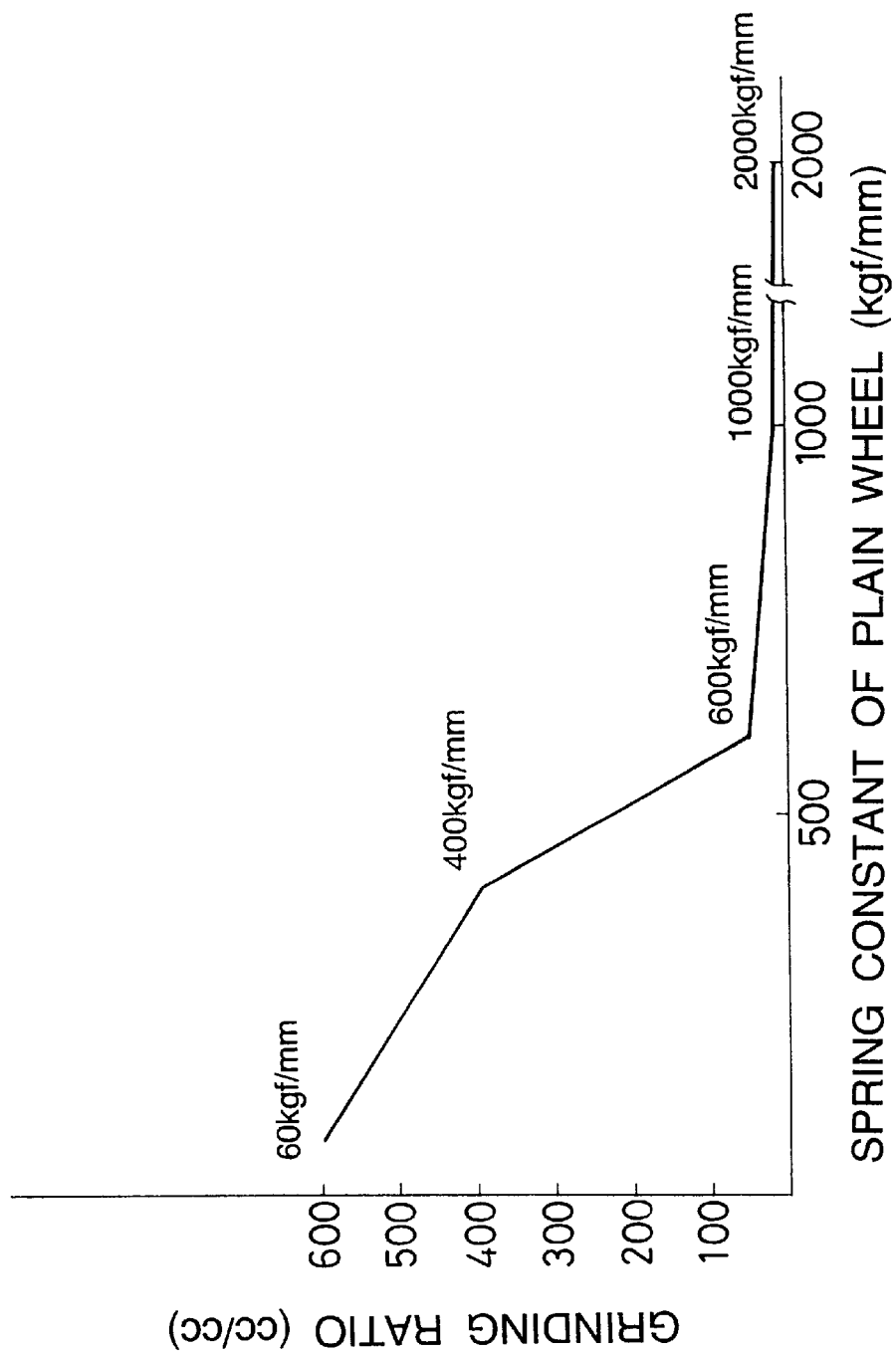
FIG. 11 is a graph showing the relationship between the spring constant of a plain wheel of the grinding wheel and a grinding ratio.

A proper spring constant of the plain wheel 52 will now be described by referring to experimental data plotted in FIG. 11. FIG. 11 shows experimental data on the relationship between a spring constant of the plain wheel 52 and a grinding ratio. The experimental data was obtained on condition that the circumferential speed of the work roll 1$a$ is vr=300 m/min, the circumferential speed of the grinding wheel is vg=1570 m/min, the speed of movement of the grinding wheel in the roll axial direction (i.e., the traverse speed) is vs=10 mm/sec, the vibration frequency of the work roll la is f=35 Hz, and th e one-side amplitude of vibration of the work roll 1$a$ is a=0.01 mm.

As seen from FIG. 11, the grinding ratio lowers with the larger spring constant, and rises with the smaller spring constant. In other words, if the spring constant is too large, the chattering marks are caused, the grinding ratio is lowered, and further the abrasive layer 51 is soon worn away thoroughly. In order to minimize the exchange pitch of the grinding wheel 20 and avoid a reduction in productivity due to exchange of the grinding wheel, each grinding wheel is required to permit continuous grinding for not less than 5 days once exchanged. Meeting this exchange pitch generally needs a grinding ratio not less than 50, preferably 250. Since the grinding wheel 20 made of super abrasive grains is expensive, the grinding ratio must be as high as possible for the purpose of reducing the production cost. The reason why the grinding ratio lowers with the larger spring constant of the plain wheel 52 is that the contact force imposed on the grinding wheel 20 due to the vibration of the work roll 1$a$ is fluctuated to a larger extent and, therefore, a larger force acts on the abrasive grains of the abrasive layer 51 correspondingly to make those abrasive grains fall off therefrom. Also, if the spring constant of the plain wheel 52 is too large, the vibration of the work roll 1$a$ cannot be fully absorbed by the grinding wheel 20 and the resulting load is transmitted to the load cell 53, which results in larger fluctuations in the measure value of the contact force and hence a difficulty in controlling a grinding rate based on the contact force between the work roll 1$a$ and the abrasive layer 51 (as described later).

On the contrary, if the spring constant is small, the contact force imposed on the grinding wheel 20 due to the vibration of the work roll 1$a$ is less fluctuated. The grinding ratio is therefore raised, but accuracy of grinding control and roll profile measurement (described later) both based on the contact force is degraded. The reason why the accuracy of grinding control and roll profile measurement is degraded is that the force acting on the spindle 21 upon deflection of the grinding wheel 20 becomes so small that the load cell 53 cannot detect change in the load corresponding to small irregularities.

Assuming the spring constant of the plain wheel 52 to be 50 Kgf/mm, for example, the load difference produced by a periphery difference of 10 $\mu$m is $\Delta F=50\times0.01=0.5$ (Kgf) which is almost a limit of the detectable range, judging from resolution of general load cells. Also, the smaller spring constant of the plain wheel 52 means that the plain wheel 52 is thinner and the grinding wheel 20 is deflected to a larger extent with the same contact force, causing undue forces in the abrasive layer 51 due to distortion. Thus, if the spring constant is smaller than 30 Kgf/mm, there would occur cracks in and peel-off of the abrasive layer 51 from the plain wheel 52 even with the contact force necessary for the grinding.

It has been found from the foregoing data that the spring constant of the plain wheel 52 is preferably in the range of 1000 Kgf/mm to 30 Kgf/mm, more preferably 500 Kgf/mm to 50 Kgf/mm.

Compositions of the abrasive layer 51 will now be described. When the grinding wheel 20 employs the abrasive layer 51 made of super abrasive grains, the abrasive layer 51 is usually subjected to dressing in off-line roll grinding to keep the grinding ability constant and stabilize the grinding roughness. In on-line roll grinding, however, there is a difficulty in dressing the abrasive layer 51 from the standpoints of space and so forth. In order to keep the grinding ability constant and stabilize the grinding roughness without dressing in on-line roll grinding, it is required for the super abrasive grains of the abrasive layer 51 to be spontaneously edged at a constant rate. Proper spontaneous edging of the super abrasive grains needs adjustment of the load imposed on one super abrasive grain. For this purpose, it is required to set density, i.e., concentration, of the super abrasive grains contained in the abrasive layer 51 within the range of 50 to 100, and use a resin bond as a binder which is worn away along with the super abrasive grains while holding them together. If the concentration is not less than 100, the spontaneous edging of the super abrasive grains would be hard to occur, resulting in a decrease of the grinding ability. If the concentration is not larger than 50, the service life of the super abrasive grains would be shortened. Further, if a pitolifido bond or the like which is hard to wear away is used as a binder, projection of the super abrasive grains from the binder surface would be so small as to require dressing. With a combination of the above range of concentration and the binder comprising a resin bond, the super abrasive grains can be easily spontaneously edged to enable the continuous grinding without dressing. It has been also found that the size of the super abrasive grains, i.e., the grain size, is required to be in the range of 80 to 180 for obtaining the surface roughness of the work roll 1$a$ in the range of 0. 3 to 1.5 $\mu$m in average.

Operation depending on an arrangement of the grinding wheel 20 will now be described. As mentioned above, the grinding wheel 20 is arranged such that the axis Gc1 of the spindle 21 is inclined by the small angle of $\alpha$ relative to the line Sc perpendicular to the axis Rc of the work roll 1$a$, and the contact line between the abrasive layer 51 and the work roll 1$a$ is defined only in one side as viewed from the center of the grinding wheel. With such an arrangement of the grinding wheel 20, the plain wheel 52 can effectively develop its elastically deforming function, also as mentioned above. Further, because of the abrasives surface 51 being annular, if the surface of the abrasive layer 51 is pressed against the work roll 1$a$ in parallel relation, there are defined contact lines between the abrasive layer 51 and the work roll 1$a$ at two points on both sides of the wheel center. As a result of the two contact lines being defined, the work roll 1$a$ is simultaneously ground at those two points. Therefore, if the work roll 1$a$ has a periphery difference, the two grinding surfaces interfere with each other to cause chattering marks. Also, the contact at two points between the grinding wheel and the work roll leads to a difficulty in controlling the contact force therebetween. In this embodiment, since the contact line between the annular abrasive layer 51 and the work roll 1$a$ is defined only at one point on one side of the wheel center, the chattering is prevented to enable proper control of the contact force (as described later).

Figure 12:
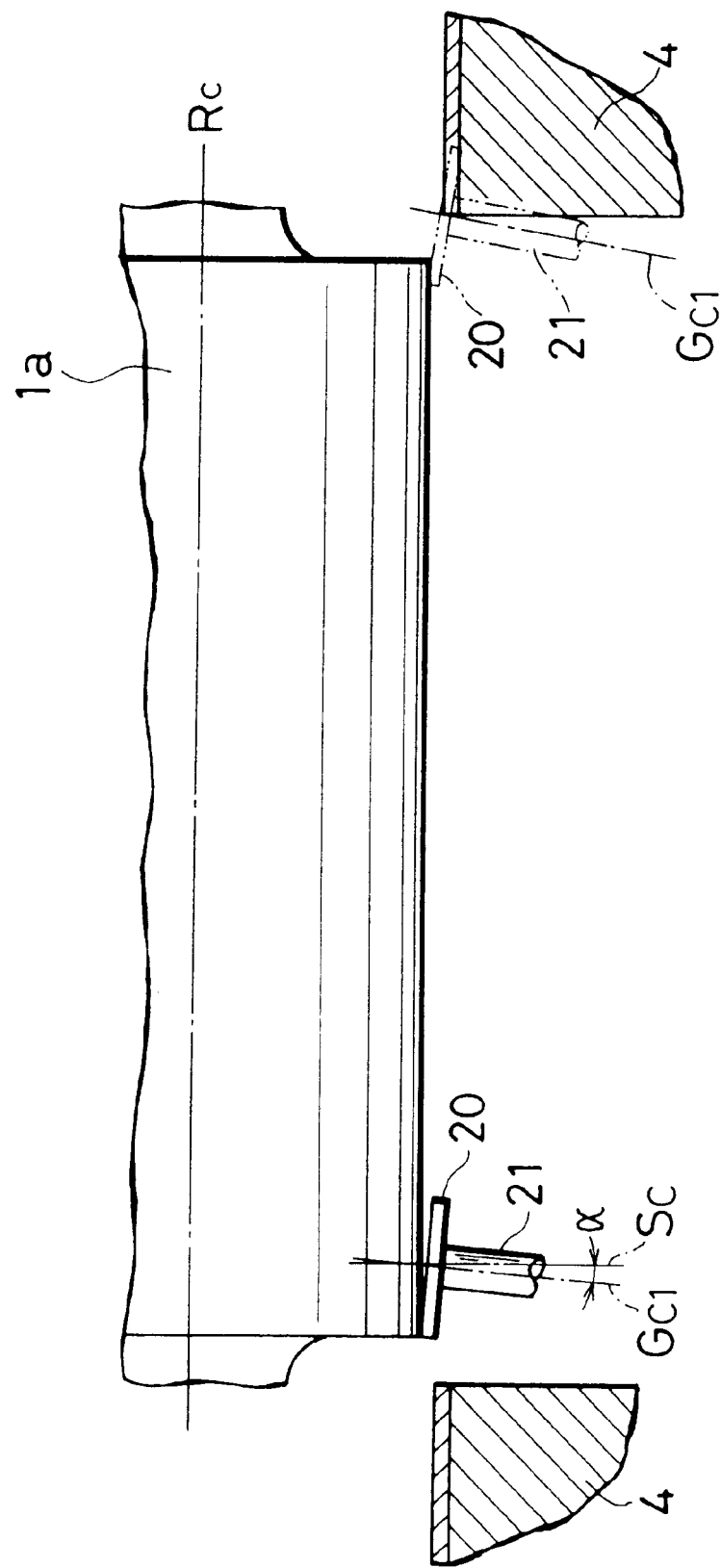
FIG. 12 is a representation showing interference between the grinding wheel and a stand in the case of grinding the work roll under a condition that a spindle of the grinding wheel is inclined relative to a line perpendicular to the roll axis.

When the spindle 21 is inclined by the small angle of $\alpha$ relative to the line Sc perpendicular to the axis Rc of the work roll 1$a$, there is a fear that a zone not subjected to the grinding may occur at one end of the work roll 1a, or the grinding wheel 20 may interfere with the stand 4 on that one end side of the work roll 1a, as shown in FIG. 12. Therefore, the grinding wheel 20 of the grinding head unit 5a and the grinding wheel 20 of the grinding head unit 5b are arranged, as shown in FIG. 6, such that the respective axes Gc1 of their spindles 21 are inclined by the small angle of α in opposite directions relative to the respective lines Sc perpendicular to the axis Rc of the work roll 1a, and the respective contact lines between the abrasive layers 51 and the work roll 1a are each defined only in one corresponding roll end side as viewed from the center of the grinding wheel. This arrangement enables the work roll 1a to be ground over its entire length without causing the above interference with the stand. The foregoing description equally applies to the grinding wheel 20 of the grinding head unit 6a and the grinding wheel 20 of the grinding head unit 6b.

Control of the on-line roll grinding system of this embodiment will now be described. The on-line roll grinding system of this embodiment has various control functions below:

(1) roll profile grinding control
(2) independent grinding control
(3) overlap zone distribution control
(4) roll profile measurement as a on-line roll profile meter
(5) roll profile compensation
(6) combination of roll profile measurement and roll profile grinding control These control functions are previously stored in the form of programs in the computer 13c.

(1) Roll Profile Grinding Control

Figure 13:
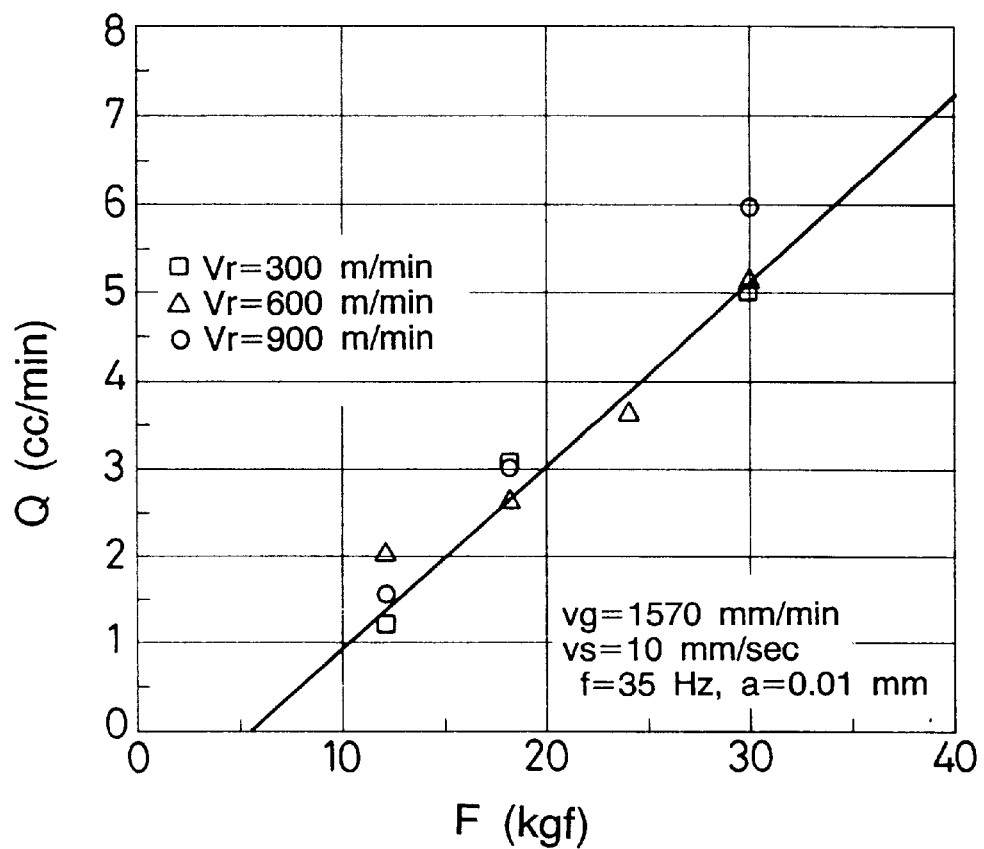
FIG. 13 is a graph showing the relationship of a contact force between the work roll and the grinding wheel versus a grinding rate.
Figure 14:
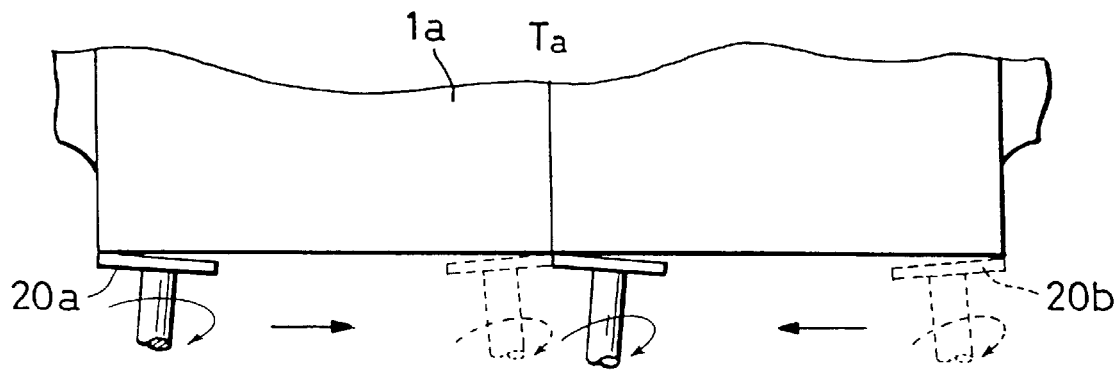
FIG. 14(A) is a representation showing an overlap zone of the grinding occurred when using plurality of grinding wheels.
FIGS. 14(B) and 14(C) are representations for explaining a control method for distributing the grinding overlap zone.
Figure 14:
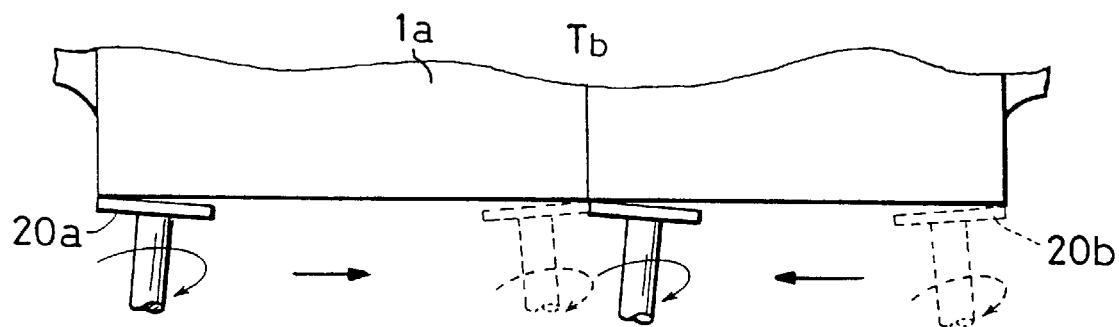
Figure 14:
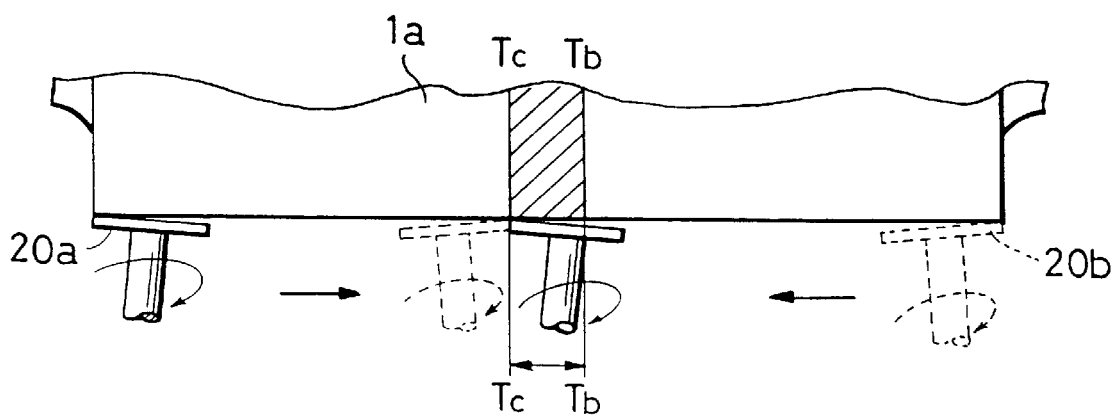

A description will first be given of the roll profile grinding control. FIG. 13 shows experimental data on the relationship of a contact force F between the abrasive layer 51 of the grinding wheel 20 and the work roll 1a versus a grinding rate Q per unit time. The experimental data was obtained at the circumferential speed of the work roll 1a of vr=300 m/min, 600 m/min and 900 m/min on condition that the circumferential speed of the grinding wheel is vg=1570 m/min, the speed of movement of the grinding wheel in the roll axial direction (i.e., the traverse speed) is vs=10 mm/sec, the vibration frequency of the work roll la is f=35 Hz, and the one-side amplitude of vibration of the work roll 1a is a=0.01 mm. As seen from the graph of FIG. 13, the grinding rate Q per unit time changes almost linearly depending on the contact force F between the abrasive layer 51 and the work roll 1a. Accordingly, the grinding rate Q of the work roll 1a can be optionally changed by controlling the contact force F between the abrasive layer 51 and the work roll 1a by the grinding wheel movement device 23 disposed in each of the grinding head units 5, 6.

To perform the above control, the load cell 53 is arranged in abutment with the end of the spindle 21 on the side opposite to the grinding wheel for more precisely detecting the contact force F in this embodiment. Also, the relationship between the contact force F and the grinding rate Q shown in FIG. 13 is previously stored in the computer 13c shown in FIG. 7, and the detected contact force F is input to the computer 13c. Then, the deflection of the plain wheel 52 is changed by the movement motor 57 to reach the target grinding rate, thereby controlling the contact force F (see FIG. 21). As a result, the work roll 1a can be ground to a predetermined profile.

The grinding rate is also changed by varying the speed of movement of the abrasive layer 51 in the roll axial direction (i.e., the traverse speed) while keeping the contact force F between the abrasive layer 51 and the work roll 1a constant. In other words, when the abrasive layer 51 is moved at a higher speed, the time during which the abrasives are held in contact with the work roll is shortened and the grinding rate is reduced. Conversely, moving the abrasive layer 51 at a lower speed increases the grinding rate. Accordingly, by controlling the traverse speed of the abrasive layer 51, the grinding rate of the work roll 1a can also be changed optionally.

Figure 21:
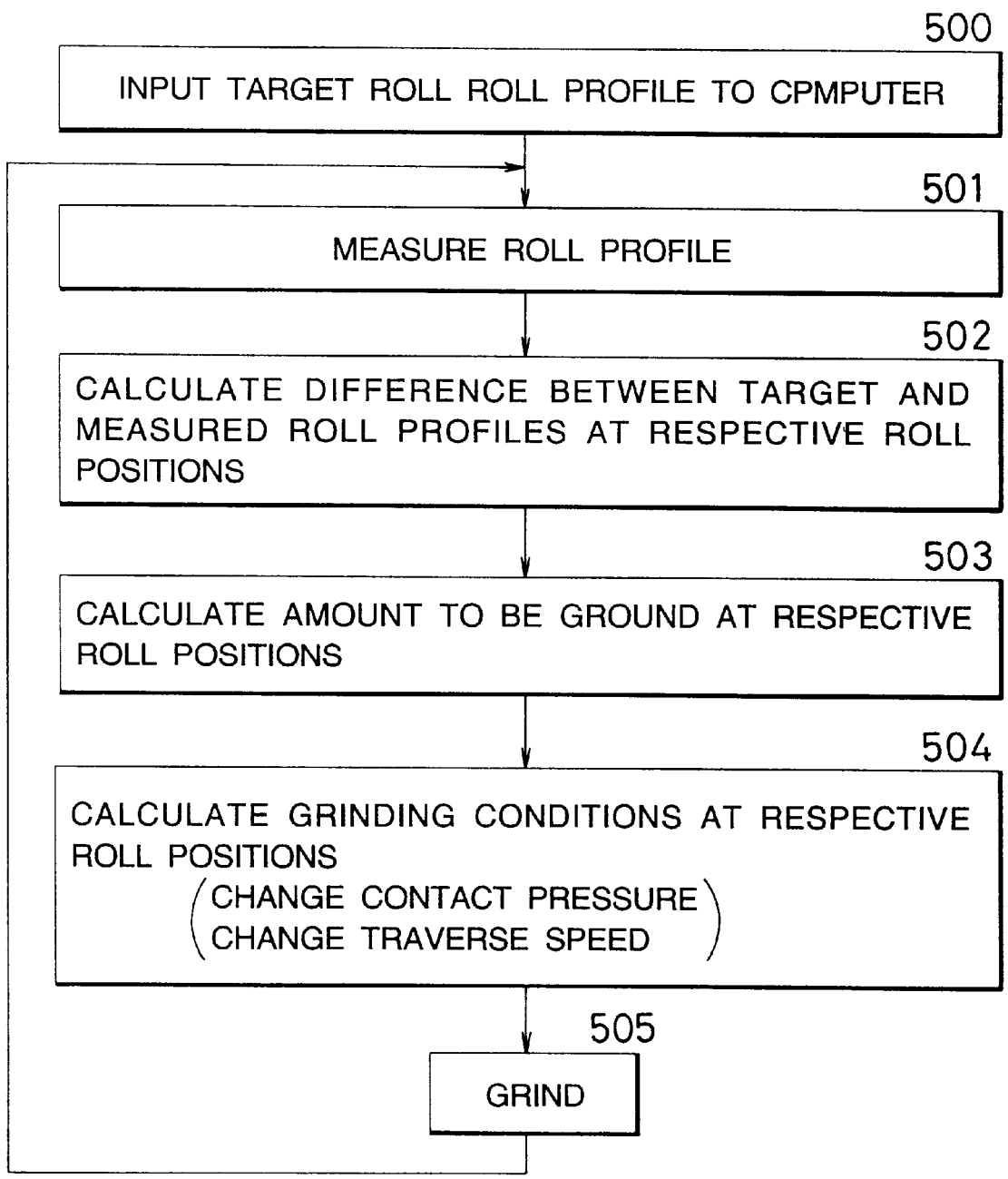
FIG. 21 is a flowchart showing procedures of grinding the work roll into a target profile based on the roll profile obtained by the first or second roll profile calculating function.

Specifically, the detected contact force F is input to the computer 13c, the traverse speed of the abrasive layer 51 is controlled by the traverse motor 57 to reach the target grinding rate, while controlling the deflection of the plain wheel 52 by the movement motor 57 so that the contact force F is kept constant (see FIG. 21). As a result, the work roll 1a can be ground to a predetermined profile.

When controlling the contact force F between the abrasive layer 51 and the work roll 1a by the grinding wheel movement device 23, as mentioned above, if there exists a backlash in the axial direction of the spindle 21, the movable mass moving back and forth upon the vibration of the work roll 1a is abruptly increased, whereby the contact force F between the abrasive layer 51 and the work roll 1a is changed to a large extent. If the contact force is changed so large, the grinding wheel movement device 23 can no longer control the contact force. To make such a backlash as small as possible, in this embodiment, the backlashless pre-loaded ball screw 56 is used as the grinding wheel movement device 23, and other slide parts are constituted by using those parts which have small clearances. Further, the movement motor 57 for driving the ball screw 56 comprises an electric motor. As a result, the contact force can be easily controlled by the grinding wheel movement device 23, making it possible to hold the position of the grinding wheel 20 during the grinding and finely move the grinding wheel 20 back and forth.

(2) Independent Grinding Control

A description will now given of the independent grinding control of the grinding head units 5a, 5b or 6a, 6b.

Because of contact with the strip, the rolling zone of the work roll 1a is worn away about 2 μm/radius after the rolling of one coil, while the unrolling zone of the work roll is not worn away because of no contact with the strip. Accordingly, there occurs a periphery difference between the rolling zone and the unrolling zone. The unrolling zone exists at both ends of the work roll on the operating and drive sides.

In the case of mounting the grinding head units 5a, 5b or 6a, 6b together onto a single frame, when one grinding head unit 5a or 6a is positioned in the unrolling zone on the operating side, the other grinding head unit 5b or 6b is positioned at the center of the work roll 1a. Therefore, in attempt to grind one unrolling zone by one grinding head unit, the other grinding head unit is positioned in the rolling zone and can not grind the other unrolling zone.

Also, when the two grinding head units are mounted together onto a single frame, the frame has a length larger than half of the work roll 1a, causing a problem that a coolant ejected from the coolant headers 15 during the rolling is blocked by the frame and the work roll la cannot be cooled sufficiently.

In this embodiment, the two grinding head units 5a, 5b or 6a, 6b are arranged for each work roll 1a and are controlled to perform the grinding independently of each other. Therefore, the two grinding head units 5a, 5b or 6a, 6b are divided in their role such that the unrolling zone on the operating side can be ground mainly by the grinding head unit 5a or 6a and the unrolling zone on the drive side can be ground mainly by the grinding head unit 5b or 6b. As a result, the unrolling zones subjected to no abrasion can be ground to a larger extent so that there occurs no periphery difference between the rolling zone and the unrolling zones. Such control is performed by rotating the traverse motor 58 with a command from the control unit 13b to move the grinding head unit 5 or 6 over the traverse rail 7, 8 through meshing between the pinion 58b and the rack 14, and by rotating the movement motor 57 with a command from the control unit 13a to advance the abrasive layer 51 through movement of the ball screw 56.

The grinding head unit 5 or 6 is sometimes moved to the center of the work roll 1a for removing the roughed roll surface in the rolling zone or the fatigue layer on the roll surface. This control is also performed by rotating the traverse motor 58 with a command from the control unit 13b to move the grinding head unit 5 or 6.

In that way, it is possible to efficiently grind the unrolling zones of the work roll 1a at its both ends and hold the roll profile constant for a long period of time. It is to be noted that when the work roll 1a is long as encountered in rolling mills for slabs, the grinding head units 5, 6 may be provided three or four such that the units are moved to respective zones to be ground for grinding those zones independently of one another.

Further, in this embodiment, since the grinding head units 5a, 5b or 6a, 6b are separated from each other, the work roll 1a can be cooled sufficiently by the coolant ejected from the coolant headers 15 during the rolling.

(3) Overlap Zone Distribution Control

A description will now be given of the distribution control for an overlap zone which occurs by using the grinding control unit 5 or 6 comprising plural units.

When the plural grinding head units 5a, 5b or 6a, 6b are moved to the center of the work roll 1a, the grinding surfaces of the grinding wheels 20a, 20b adjacent to each other mutually overlap at the center of the work roll 1a, as shown in FIG. 14(A). At this time, if the grinding surfaces always overlap at the same position Ta, the overlap zone is ground to a larger extent than the remaining zone, resulting in a grinding error in the overlap zone.

If a plurality of grinding head units are mounted together onto a single frame, a plurality of corresponding grinding wheels are always moved in the same-stroke as one-piece and, therefore, the grinding overlap zone inevitably occurs at the same position. Thus, an grinding error cannot be avoided in the overlap zone, with a fear of producing a periphery difference on the roll surface.

In this embodiment, by operating the two grinding head units 5a, 5b or 6a, 6b independently of each other, the grinding overlap zone of the grinding wheels 20a, 20b does not remain at one location as indicated by the overlap line Ta, but can be distributed over the range between overlap lines Tb and Tc spanning in the roll axial direction, as shown in FIGS. 14(B) and 14(C). Consequently, the grinding error in the overlap zone can be reduced.

Figure 15:
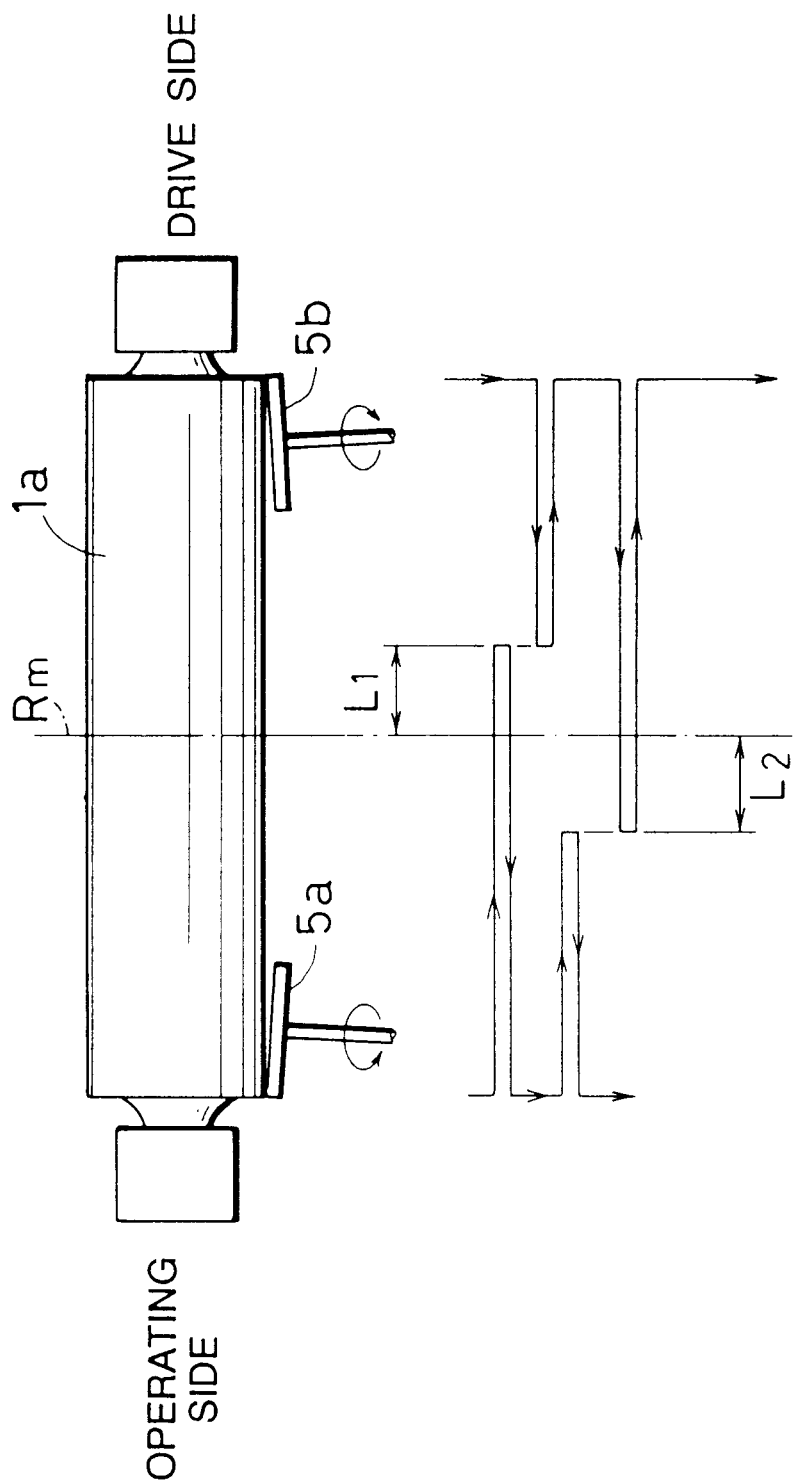
FIG. 15 is a diagram for explaining the overlap dispersion control.
Figure 16:
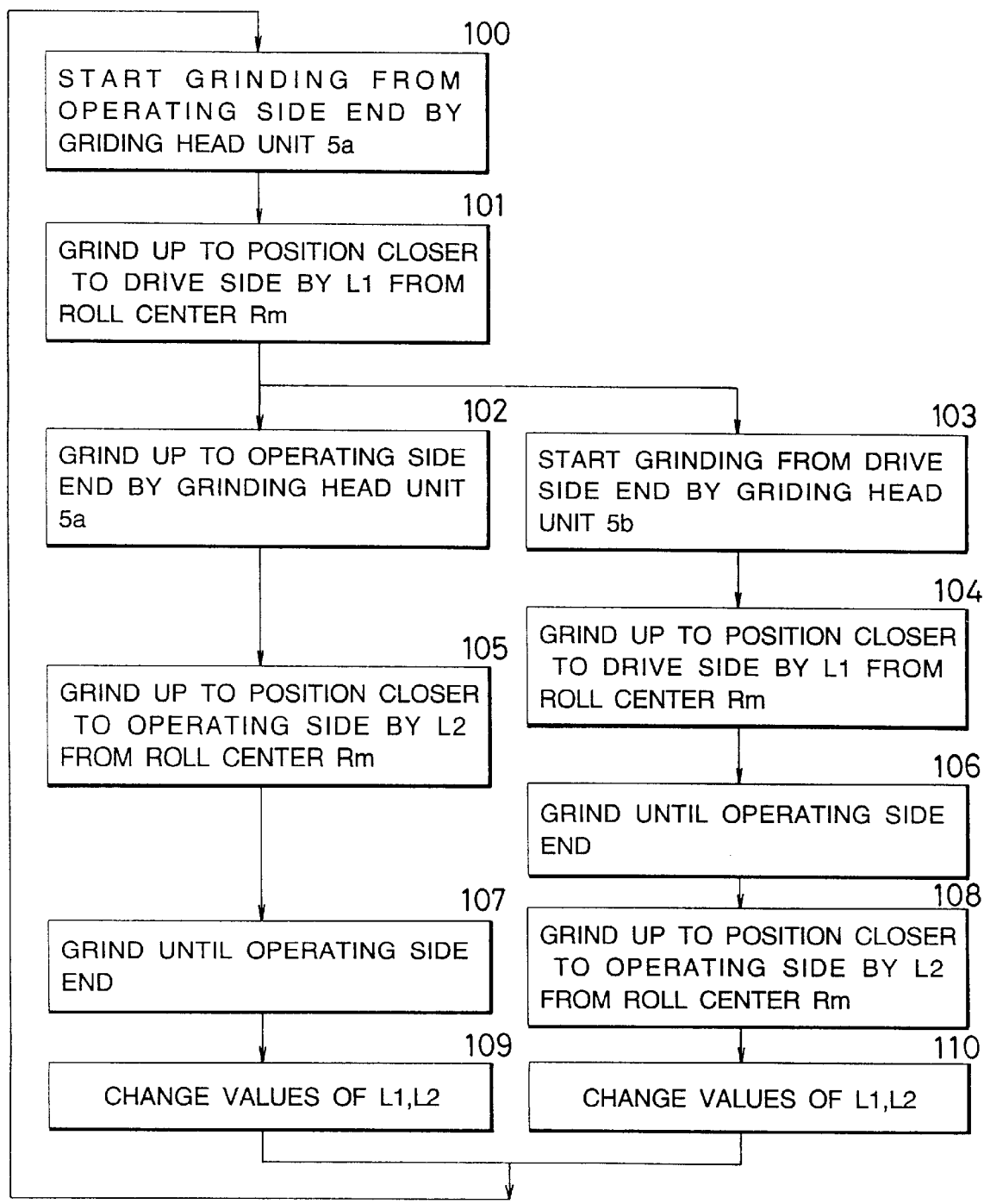
FIG. 16 is a flowchart showing procedures of the overlap zone distributing control.

FIGS. 15 and 16 show procedures of the above control for distributing the overlap zone. These control procedures are previously stored in the form of programs in the computer 13c. First, the grinding head unit 5a is operated to start grinding from the operating side end of the work roll 1a toward the roll center (step 100), the grinding being continued up to a position closer to the drive side by a distance L1 from the roll center Rm (step 101). Then, the direction of movement of the grinding head unit 5a is reversed for grinding the work roll 1a up to the operating side end (step 102). In parallel, the other grinding head unit 5b is operated to start grinding from the drive side end of the work roll 1a toward the roll center (step 103), the grinding being continued up to the position closer to the drive side by the distance L1 from the roll center Rm (step 104). Then, the direction of movement of the grinding head unit 5a is reversed for grinding the work roll 1a up to a position closer to the operating side by a distance L2 from the roll center Rm (step 105) and, in parallel, the direction of movement of the grinding head unit 5b is also reversed for grinding the work roll 1a up to the drive side end (step 106). Subsequently, the direction of movement of the grinding head unit 5a is reversed again for grinding the work roll 1a up to the operating side end (step 107) and, in parallel, the direction of movement of the grinding head unit 5b is reversed again for grinding the work roll 1a up to the position closer to the operating side by the distance L2 from the roll center Rm (step 108). Then, after changing values of L1, L2, the above procedures are repeated (steps 109 and 110). In that way, the work roll 1a can be ground while distributing the overlap zone.

(4) Roll Profile Measurement as On-Line Roll Profile Meter

A description will now be given of operation of the on-line roll profile meter built in the on-line roll grinding system.

Figure 17:
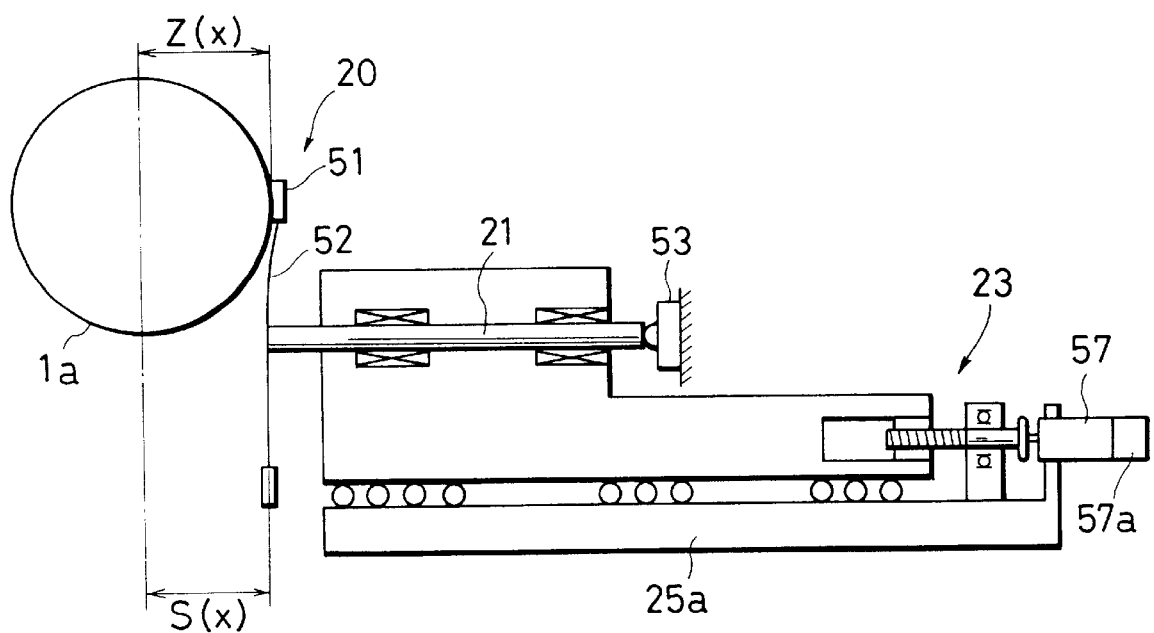
FIG. 17 is a representation for explaining the positional relationship between the work roll, a grinding wheel movement device, and a deflection of the grinding wheel in the case of measuring a roll profile.

In the system of this embodiment in which the plain wheel 52 of the grinding wheel 20 has an elastically deforming function and the contact force between the work roll 1a and the abrasive layer 51 is controlled by the movement motor 57 of the grinding wheel movement device 23, the relationship between the roll profile, the position of the grinding wheel movement device, and the contact force is expressed below by referring to a schematic representation of FIG. 17.

$$Z(x) = S(x) - F(x)/K$$

where x: coordinate in the roll axial direction

Z(x): roll profile (mm)

S(x): position of the grinding wheel movement device (mm)

F(x): contact force between the work roll and the grinding wheel (Kgf)

K: spring constant of the grinding wheel (Kgf/mm)

First, assuming that the grinding head unit is traversed in the axial direction of the work roll 1a while keeping the grinding wheel movement device 23 fixed, since the S(x) is always constant, change in the roll diameter is expressed by:

$$\Delta Z(x) = -\Delta F(x)/K$$

Thus, the quotient resulted by dividing the change ΔF(x) in the contact force between the work roll and the grinding wheel by the spring constant K is a deflection of the grinding wheel 20, i.e., the change ΔZ(x) in position of the roll surface, and the roll profile is obtained by processing that position change to be correspondent to the roll axial coordinate. This is a first roll profile calculating function.

Figure 18:
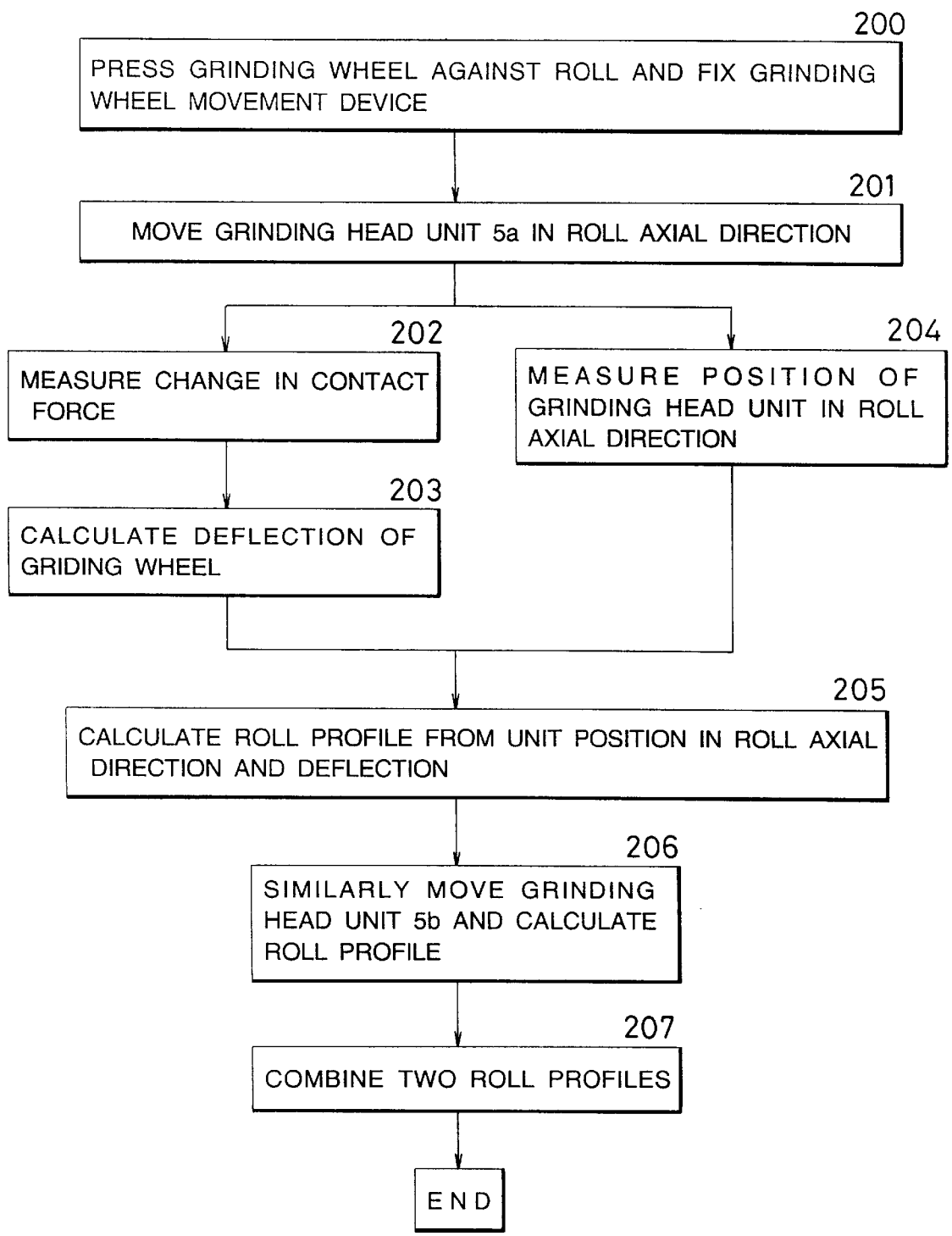
FIG. 18 is a flowchart for explaining a first roll profile calculating function.

FIG. 18 shows processing procedures for the first roll profile calculating function. These processing procedures are previously stored in the form of programs in the computer 13c. First, the grinding wheel 20 of the grinding head unit 5a is pressed against the operating side end of the work roll 1a and the grinding wheel movement device 23 is fixed in place (step 200). Then, while keeping the grinding wheel movement device 23 fixed, the traverse motor 58 is rotated to move the grinding head unit 5a in the roll axial direction (step 201). During this movement, change in the contact force between the work roll 1a and the abrasive layer 51 is measured by the load cell 53 (step 202), and the deflection of the grinding wheel 20 is calculated from the aforesaid relationship (step 203). At the same time, the position of the grinding head unit 5a in the roll axial direction is measured based on a signal from the encoder 58b of the traverse motor 58 (step 204). Then, a roll profile is calculated from both the roll axial position of the grinding head unit 5a and the deflection of the grinding wheel 20 (step 205). For the grinding head unit 5b, the similar procedures to the above steps are executed to calculate a roll profile (step 206). However, the grinding head unit 5b is moved from the drive side end in the roll axial direction. The roll profiles obtained from movement of the two grinding head units 5a, 5b are combined with each other to determine a profile over the entire length of the work roll 1a (step 207).

As another method of measuring the roll profile, change $\Delta S(x)$ in the position of the grinding wheel movement device 23 is detected while controlling the grinding wheel movement device 23 so that the contact force $F(x)$ between the work roll and the grinding wheel is always kept at a constant load in the roll axial direction.

Since $F(x)/K$ is constant in the roll axial direction, change in the roll diameter is expressed by:

$$\Delta Z(x) = \Delta S(x)$$

Thus, the roll profile is obtained by determining the change $\Delta S(x)$ in the position of the grinding wheel movement device 23 from the detected value of the encoder 57a of the movement motor 57, and processing that position change to be made correspondent to the roll axial coordinate. This is a second roll profile calculating function.

Figure 19:
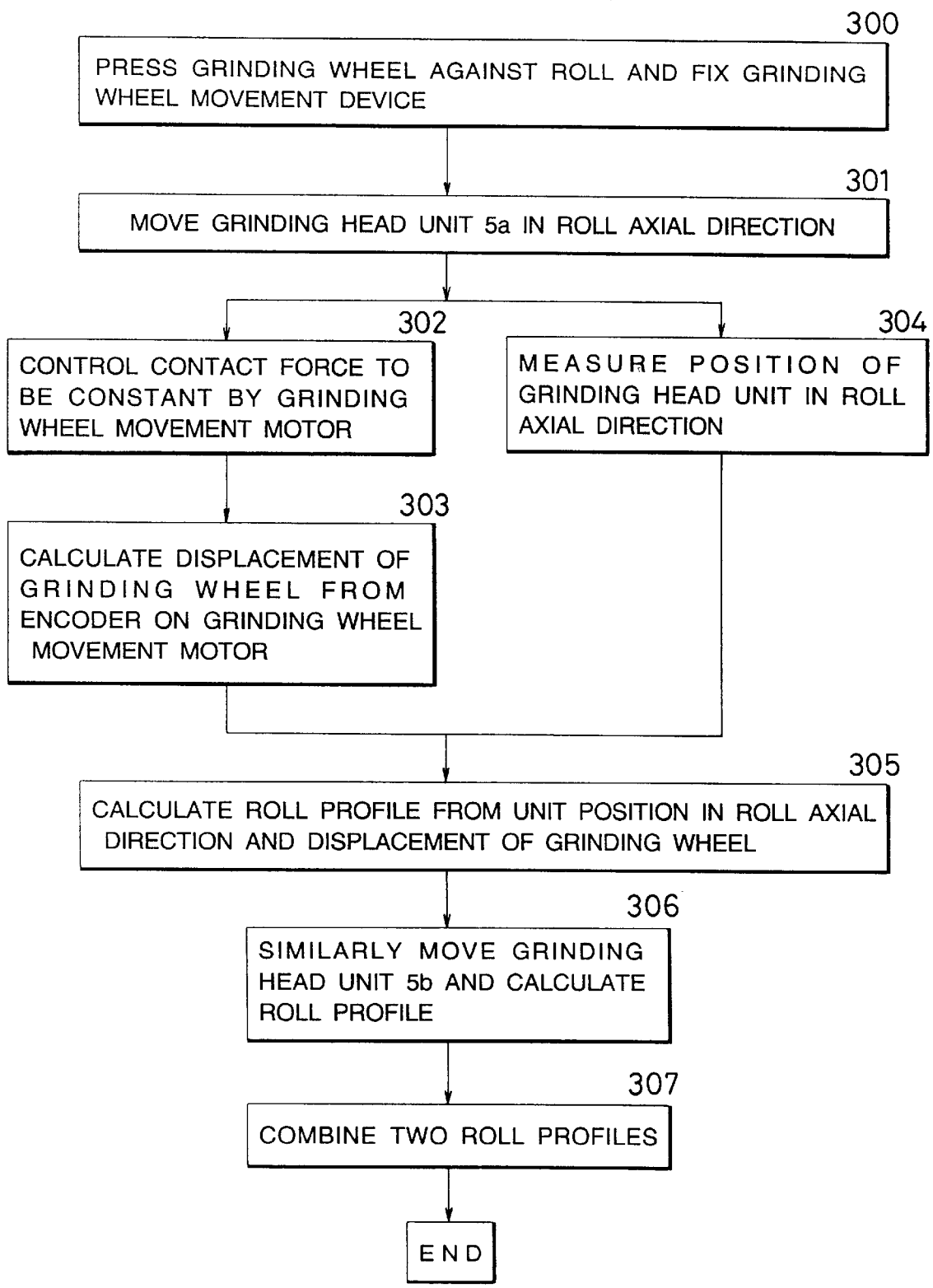
FIG. 19 is a flowchart for explaining a second roll profile calculating function.
Figure 20:
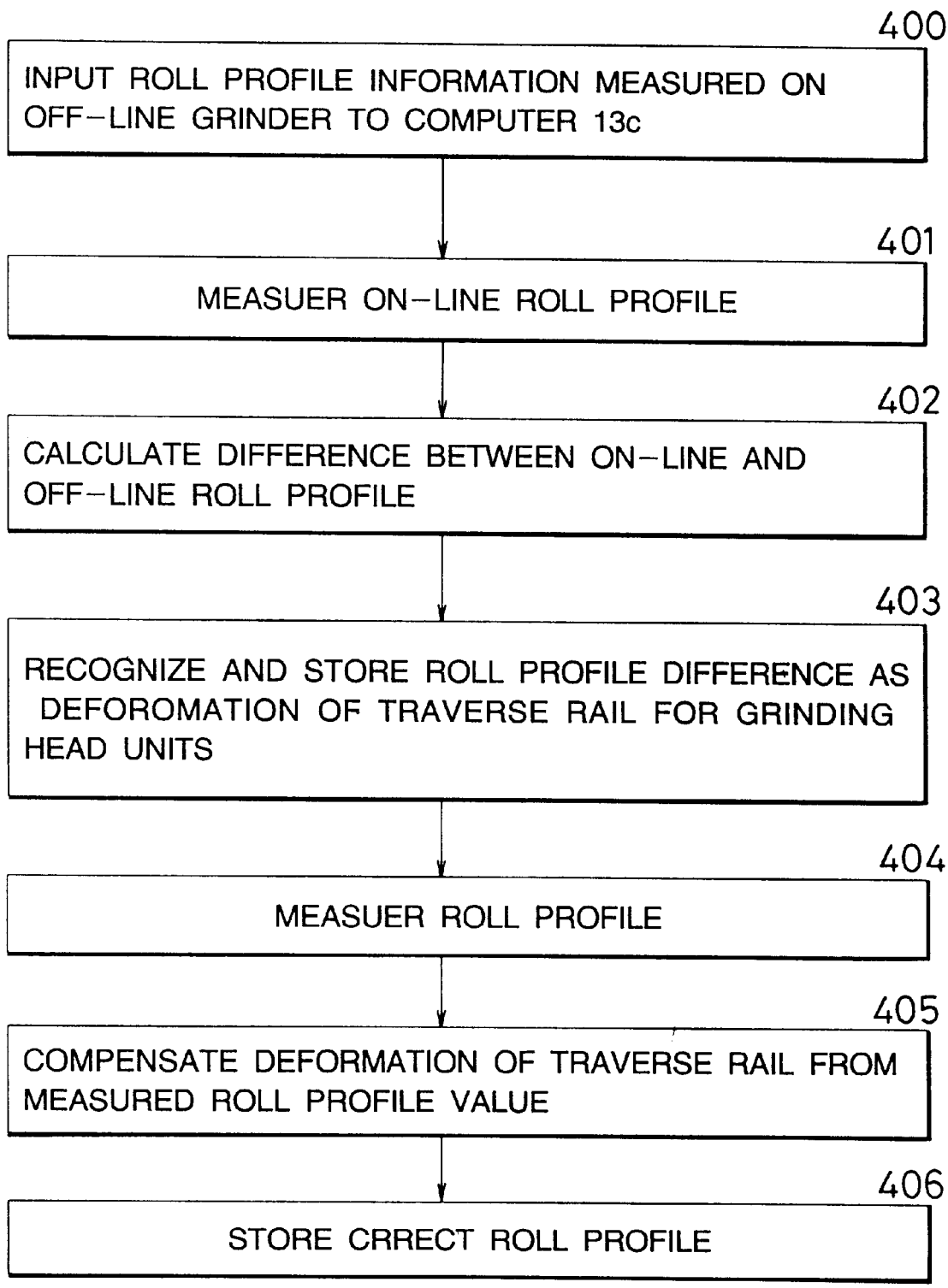
FIG. 20 is a flowchart showing procedures of compensating the roll profile obtained by the first or second roll profile calculating function based on roll profile data obtained off-line.

FIG. 19 shows processing procedures for the second roll profile calculating function. These processing procedures are previously stored in the form of programs in the computer 13c. First, the grinding wheel 20 of the grinding head unit 5a is pressed against the operating side end of the work roll 1a (step 300). Then, and the grinding wheel movement device 23 is fixed in place (step 200). Then, after tentatively setting the grinding wheel movement device 23 to a certain position, the traverse motor 58 is rotated to move the grinding head unit 5a in the roll axial direction (step 301). During this movement, change in the contact force between the work roll 1a and the abrasive layer 51 is measured by the load cell 53, and the position (stroke position) of the grinding wheel movement device 23 is controlled by the movement motor 57 so that the measured contact force is kept constant (step 302). A displacement of the grinding wheel 20 is calculated based on a signal from the encoder 57a of the movement motor 57 (step 303). At the same time, the position of the grinding head unit 5a in the roll axial direction is measured based on a signal from the encoder 58b of the traverse motor 58 (step 304). Then, a roll profile is calculated from both the roll axial position of the grinding head unit 5a and the displacement of the grinding wheel 20 (step 305). For the grinding head unit 5b, the similar procedures to the above steps are executed to calculate a roll profile (step 306). However, the grinding head unit 5b is moved from the drive side end in the roll axial direction. The roll profiles obtained from movement of the two grinding head units 5a, 5b are combined with each other to determine a profile over the entire length of the work roll 1a (step 307).

In that way, the profile of the work roll can be measured on-line by using the equipment of the on-line grinding system.

(5) Roll Profile Compensation

A description will now be given of a function of compensating the roll profile by using the measured value of the on-line roll profile meter.

Although the traverse rails 7, 8 of the on-line roll grinding system are initially installed in parallel to the axis of the work roll 1a, there is a fear in hot rolling mills that parallelism between them may change for a long period of time due to the heat of strips. Unless such a change in parallelism is compensated, the work roll profile measured as mentioned above cannot be said as a true profile. The computer 13c executes this compensation following the procedures shown in FIG. 20.

First, the work roll 1a is ground by an off-line roll grinder installed in a roll shop, and its roll profile after the grinding is measured by an off-line roll profile meter in advance. The measured roll profile is input to the computer 13c (step 400). After assembling the work roll 1a ground by the off-line roll grinder into the rolling mill, a profile of the work roll 1a is measured by using the above-mentioned first or second profile calculating function of the on-line roll profile meter (step 401). Then, a difference between both the roll profiles measured by the off-line and on-line roll profile meters is determined (step 402). The determined difference is recognized as a deformation (error in parallelism) of the traverse rail for the grinding head units and stored in the computer 13c (step 403). Then, after grinding the work roll 1a on-line in the subsequent rolling, a profile of the work roll 1a is measured by using the first or second profile calculating function (step 404). The measured roll profile values are compensated by subtracting the above error in parallelism therefrom (step 405), and the resulting correct measured values are stored in the computer 13c (step 406). As a result, the precise profile of the work roll 1a can be determined.

(6) Combination of Roll Profile Measurement and Roll Profile Grinding Control

A description will now be given of a function of grinding the work roll 1a into a target roll profile with the above-explained grinding control method by using the thus-obtained profile data of the work roll, with reference to FIG. 21. The processing procedures shown in FIG. 21 are also previously stored in the computer 13c.

First, a target roll profile is input in the computer 13c beforehand (step 500). Then, a profile of the work roll 1a is measured by using the first or second profile calculating function (step 501). At this time, the above process for compensating the roll profile using the measured values of the off-line roll profile meter is executed, if necessary. After determining the correct profile of the work roll 1a, a difference between the determined profile of the work roll and the target roll profile is determined (step 502). From the determined differences at respective axial roll positions, the amounts to be ground at these respective positions are calculated (step 503), and then grinding conditions at the respective axial roll positions are calculated (step 504). In the case of carrying out the grinding control while changing the contact force, the contact force between the work roll 1a and the abrasive layer 51 is controlled by the movement motor 57 of the grinding wheel movement device 23 based on the relationship of the contact force F between the work roll 1a and the abrasive layer 51 versus the grinding rate, whereby the work roll grinding rate is changed so as to grind the work roll 1a into the target profile (step 505). In the case of carrying out the grinding control while changing the traverse speed, the traverse speed of the grinding wheel 20 is controlled by the traverse motor 58 of the grinding wheel traverse device 24, whereby the work roll grinding rate is changed so as to grind the work roll 1a into the target profile (step 505).

In that way, the work roll 1a is provided with a profile identical to the target roll profile.

Second Embodiment

A second embodiment of the present invention will be described with reference to FIGS. 22 and 23. In these figures, those members which are identical to those in FIGS. 1 to 7 are denoted by the same reference numerals.

Figure 22:
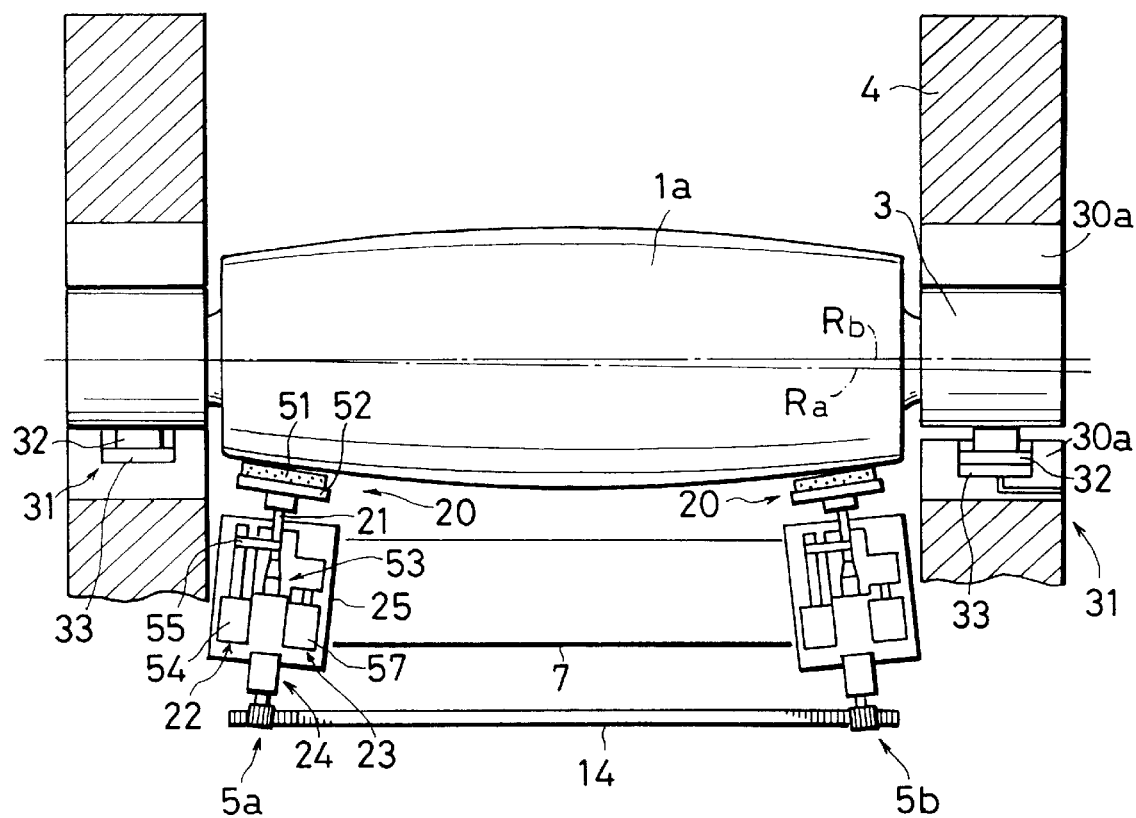
FIG. 22 is a plan view, partially sectioned, of principal parts of a rolling mill equipped with an on-line roll grinding system according to a second embodiment of the present invention.

During continued use of hot rolling mills, as abrasion of the stands 4 and the metal chocks 3 progresses under an influence of the coolant and so on, the axis Ra of the work roll 1a which has been initially perpendicular to the strip S may incline as indicated by Rb in FIG. 22. In this embodiment, the target roll profile is maintained or compensated, taking into account such a inclination of the work roll 1a.

Figure 23:
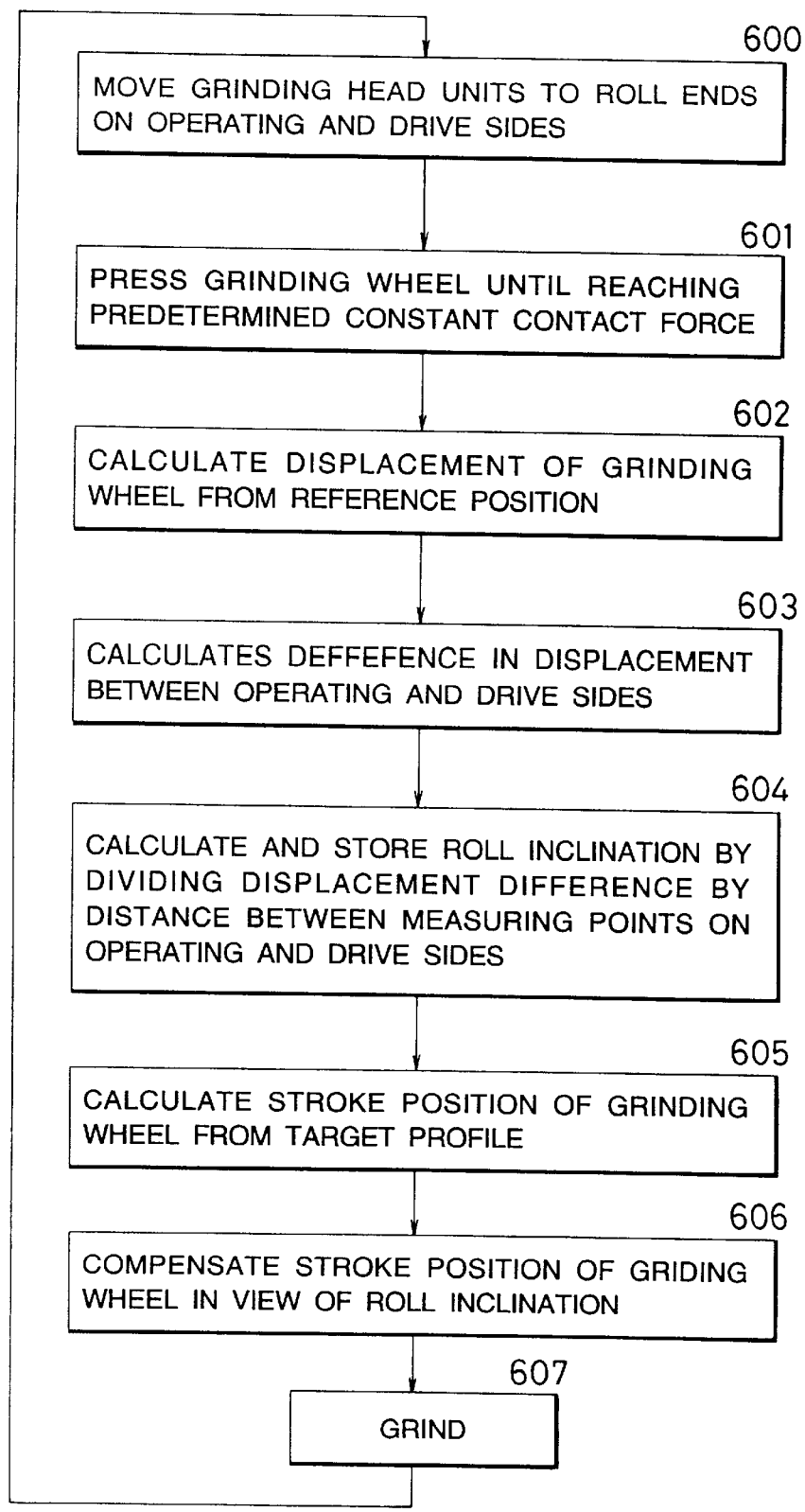
FIG. 23 is a flowchart showing grinding control in the second embodiment.

FIG. 23 is a flowchart showing control procedures of this embodiment. These control procedures are previously stored in the form of programs in the computer 13c (see FIG. 7).

First, to determine an inclination of the axis of the work roll 1a, the grinding head units 5a, 5b are respectively moved to the roll ends on the operating and drive sides (step 600). On each of the operating and drive sides, the movement motor 57 is rotated to press the abrasive layer 51 of the grinding wheel 20 against the work roll 1a (step 601). When the grinding wheel 20 is pressed until the load cell 53 detects a predetermined load, a displacement of the grinding wheel from the reference position at that time is measured by the encoder 57a built in the movement motor 57 (step 602). The load at which a displacement of the grinding wheel is measured is set to the same value on both the operating and drive sides.

Then, a difference in displacement of the grinding wheel 20 between the operating and drive sides is calculated (step 603), and this displacement difference is divided by the distance between measuring points on the operating and drive sides to determine an inclination of the axis of the work roll 1a, the determined inclination being stored in the computer 13c (step 604).

Subsequently, a stroke position of the grinding wheel 20 required for obtaining the target profile is calculated by the above-mentioned method prior to grinding the work roll 1a. The calculated stroke position is compensated by using the above stored inclination of the axis of the work roll 1a (step 606), and the number of revolutions of the grinding movement motor 57 is controlled so that the distance from the axis of the work roll 1a to the leading end of the abrasive layer 51 is held constant (step 607).

By so performing control, even with the work roll 1a inclined, the distance between the roll axis and the abrasive layer 51 can be held constant to enable constant position grinding. With this constant position grinding, if there is a periphery difference between the rolling zone and the unrolling zones as shown in FIG. 2, the deflection of the plain wheel 52 is large in the unrolling zones and small in the rolling zone corresponding to the smaller roll diameter. Such a deflection difference produces a difference in the contact force between the abrasive layer 51 and the work roll 1a, and the contact force difference in turn produces a difference in the grinding ability. Thus, the unrolling zones is ground to a larger extent than the rolling zone so that the periphery difference between the rolling zone and the unrolling zones gradually reduced and disappeared. In that way, even if the axis of the work roll 1a is inclined, the roll profile of the same diameter can be obtained.

In the above constant position grinding, if the axis of the work roll 1a is displaced during the rolling, there occurs an error in the profile grinding. To prevent such an error, as shown in FIG. 22, a chock presser 31 is mounted to a bender block 30a for each of roll benders 30, 30 for thereby horizontally pressing the metal chock 3 against a bender block 30a on the opposite side. The chock presser 31 may be mounted to the metal chock 3 rather than the bender block 30a. The chock presser 31 comprises a piston 32 and a liquid pressure chamber 33. The piston 32 is pushed under a liquid pressure supplied to the liquid pressure chamber 33, whereupon the metal chock 3 is brought into abutment by a force of the piston 32 with the bender block 30a on the opposite side. By providing the chock presser 31 on each of both the metal chocks 3, 3, the axis of the work roll 1a is held fixed, making it possible to grind the work roll 1a into the target profile without being affected by abrasion of the stands 4 and the metal chocks 3, etc.

In the case of applying an arbitrary roll profile to the work roll 1a, the work roll 1a is ground by an off-line roll grinder into such an arbitrary roll profile and this roll profile is previously stored as a target roll profile in the computer 13c (see FIG. 7). After that, the number of revolutions of the grinding wheel movement motor 57 is controlled so as to move the grinding wheel 20 following the roll profile, thereby carrying out position control grinding. Even though the rolling zone of the work roll 1a is worn away to render the roll profile changed, the original roll profile can be correctly maintained through compensate grinding at all times because the grinding wheel 20 is moved following the correct roll profile. Also in this case, an inclination of the axis of the work roll 1a is compensated in a like manner to the above. Specifically, an inclination of the axis of the work roll 1a is determined from displacements of the grinding wheels 20 on the operating and drive sides and, taking into account this inclination, the number of revolutions of the grinding wheel movement motor 57 is controlled so as to move the grinding wheel 20 following the target roll profile. As a result, even if the axis of the work roll 1a is inclined, the work roll 1a can have the correct and constant roll profile for a long period of time.

Additionally, if the inclination of the axis of the work roll 1a determined from displacements of the grinding wheels 20 is in excess of a certain allowable value, this may lead to a zigzag motion or the like of the strip S. Therefore, the computer 13c may issue an alarm in such an event.

Third Embodiment

A third embodiment of the present invention will be described with reference to FIG. 24. This embodiment is intended to perform strip crown control based on the measured roll profile values.

While the work roll 1a is assembled into the stands 4 after being ground by an off-line grinder, it produces a thermal crown by the heat of the strip S during the rolling of the strip S. Conventionally, such a thermal crown is calculated by a process computer (not shown), and the roll benders 30 provided in the rolling mill are controlled based on the calculated amount of thermal crown for causing the work roll 1a to bend, so that the strip crown of the strip S approaches a target value. However, the thermal crown calculated by the process computer is often different from the actual thermal crown depending on conditions.

Figure 24:
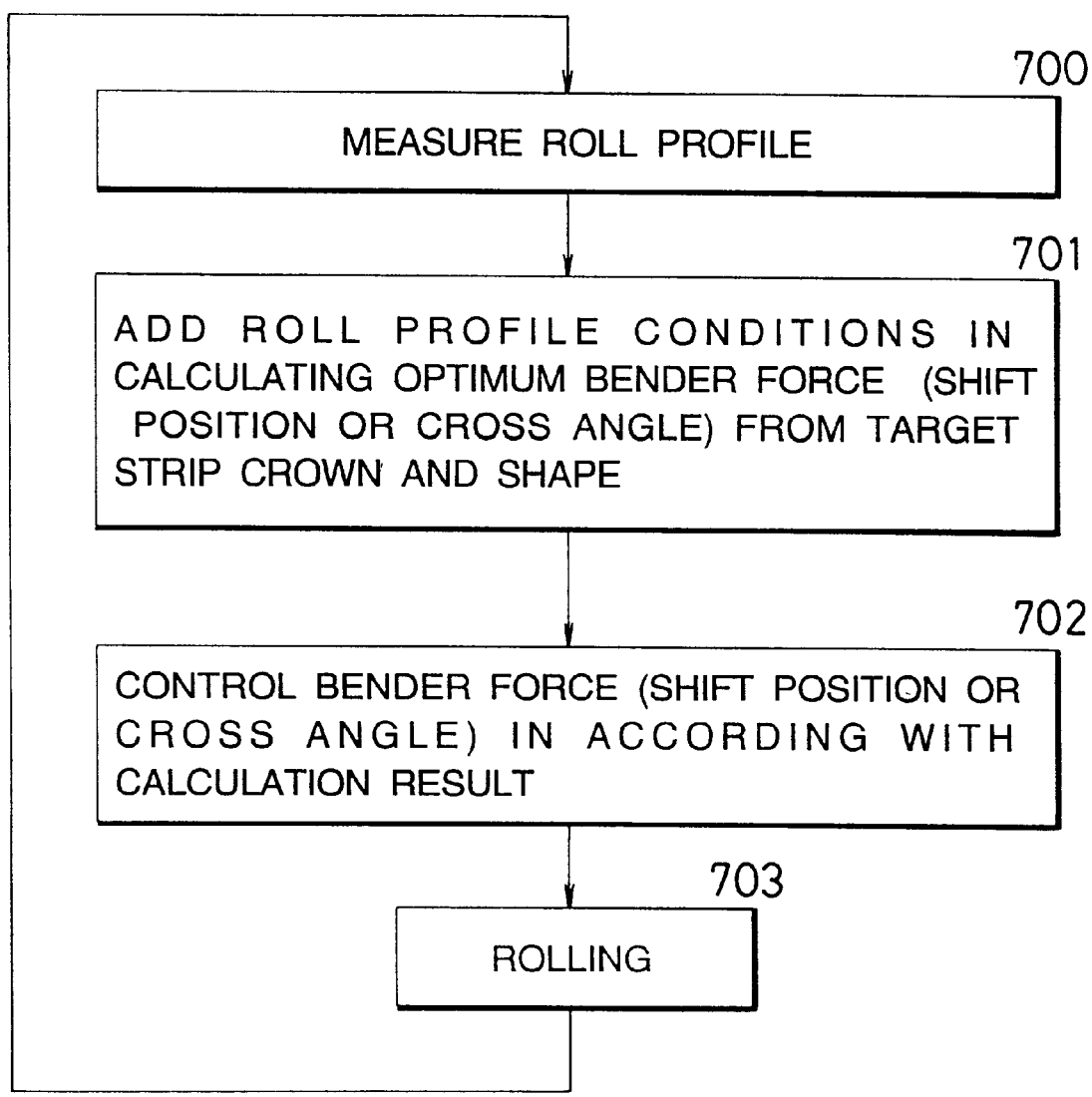
FIG. 24 is a flowchart showing rolling control according to a third embodiment of the present invention.

To prevent such a drawback, this embodiment carries out strip crown control according to procedures as shown in FIG. 24. First, a roll profile is measured by using the above-mentioned first or second roll profile calculating function (step 700). This measurement is performed in accordance with programs previously stored in the computer 13c (see FIG. 7), as explained before. Then, taking into account the measured roll profile, a host computer calculates an optimum bender force for each of the roll benders 30 from the target strip crown and the target strip shape (step 701). The bender forces of the roll benders 30 are controlled in accordance with the calculated result, causing the work roll 1a to bend (step 702), followed by rolling the work roll 1a under that state (step 703). As a result, the crown of the strip S can be closer to the target value.

Though not shown, for a rolling mill equipped with a roll shifting device for shifting the work roll in the axial direction, the crown of the strip S can be still closer to the target value by controlling not only the bender forces, but also an axial shift position of the work roll. For a rolling mill equipped with a roll crossing device for making the pair of work rolls 1a, 1a crossed to each horizontally, the crown of the strip S can be ever closer to the target value by controlling both the bender forces and the cross angle. Of course, by inputting profile values determined by the roll profile measurement after the grinding to the process computer and then performing the above shape control process, the strip crown is further improved over the entire strip length.

Fourth Embodiment

A fourth embodiment of the present invention will be described with reference to FIGS. 25 to 30. In these figures, those members which are identical to those in FIGS. 1 to 7 are denoted by the same reference numerals.

When the work rolls 1a is continuously ground for a long period of time in the on-line roll grinding system, an error in the grinding rate may be so accumulated as to cause a difference in roll diameter between the upper and lower work rolls, i.e., a diameter difference. Generally, if such a diameter difference becomes larger than 0.2 mm/diameter, a difference in rolling torque between the upper and lower work rolls exceeds an allowable value and, if it continues to increase, roll drive spindles and so forth may be damaged. To prevent such a trouble, it is required to measure diameters of the upper and lower work rolls after the grinding at a certain time interval. In this embodiment, a system for measuring diameters of the work rolls on-line after the grinding is added to the above-explained on-line roll grinding system.

Figure 25:
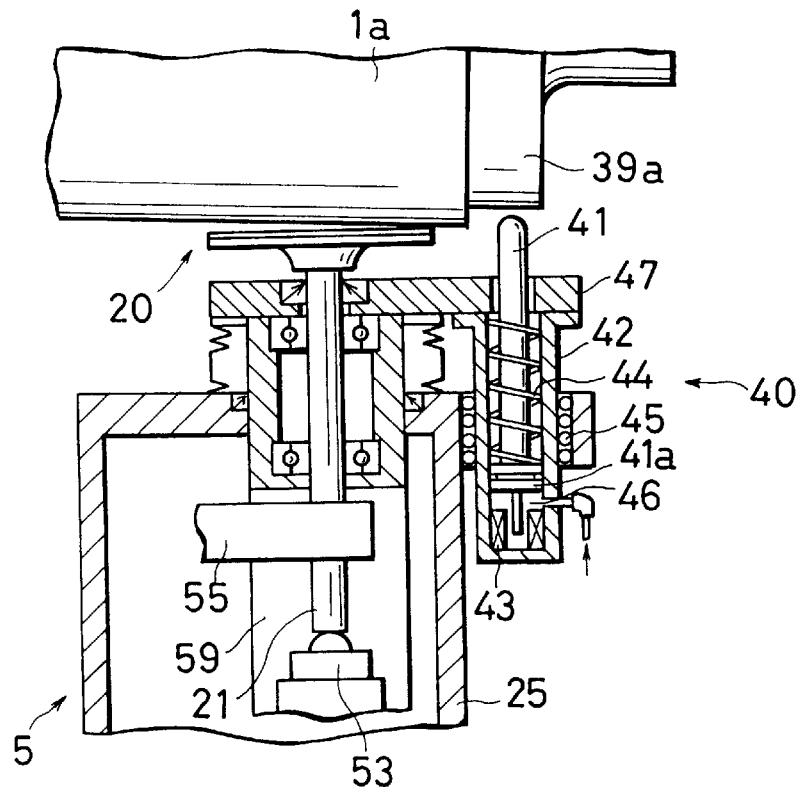
FIG. 25 is a transverse sectional view of principal parts of a rolling mill equipped with an on-line roll grinding system according to a fourth embodiment of the present invention.
Figure 26:
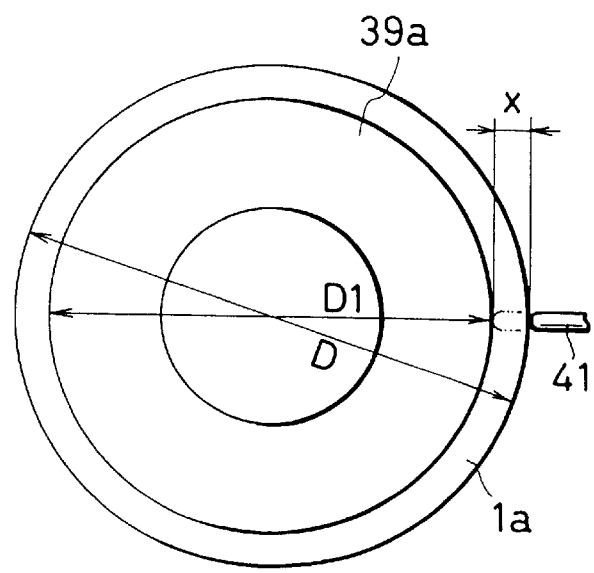
FIG. 26 is a diagram showing the relationship between the work roll, a reference small-diameter zone, and a displacement of a measuring rod in the fourth embodiment.

In FIG. 25, the work roll 1a is formed on at least one end thereof with a reference small-diameter zone 39a which has been ground and measured by an off-line grinder so as to have a smaller diameter than that of a strip passage zone (i.e., a roll barrel). The roll diameter in the reference small-diameter zone 39a is assumed to be D1, as shown in FIG. 26. Also, a roll periphery difference measuring device 40 is integrally attached to the case 25 of the grinding head unit 5. The grinding head unit 6 also has the same construction.

The roll periphery difference measuring device 40 comprises a measuring rod 41 integral with a piston 41a, and a case 42 for guiding both the piston 41a and the measuring rod 41. The case 42 is attached to a cover 47 in turn attached to the body 59 so that the case 42 is movable together with the grinding wheel 20. Within the case 42, there is defined a liquid pressure chamber 46 for pushing both the piston 41a and the measuring rod 41 toward the work roll 1a, and there are disposed a displacement meter 43 for measuring a displacement of the measuring rod 41 and a spring 44 for discharging a liquid pressure out of the liquid pressure chamber 46 and returning the measuring rod 41 back to its home position at the time other than measurement.

Figure 27:
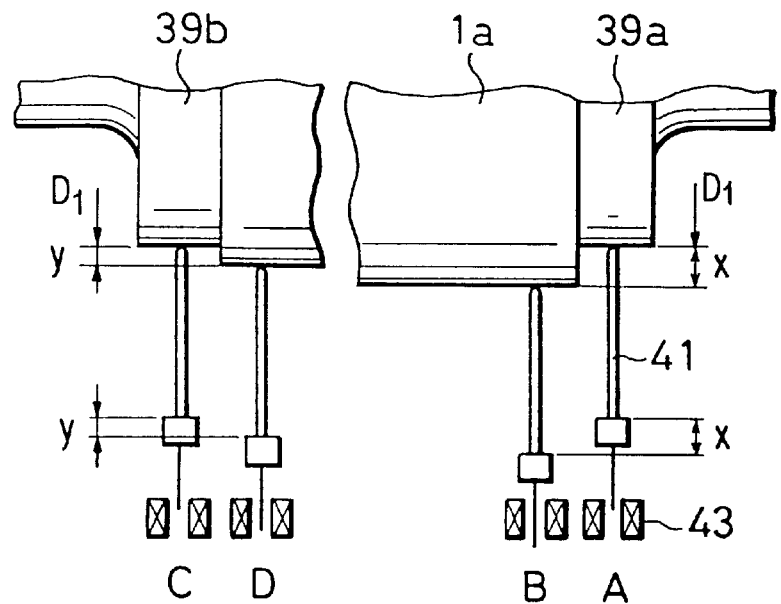
FIG. 27 is a representation for explaining a method of measuring a periphery difference and a method of measuring cylindricity in the fourth embodiment.
Figure 28:
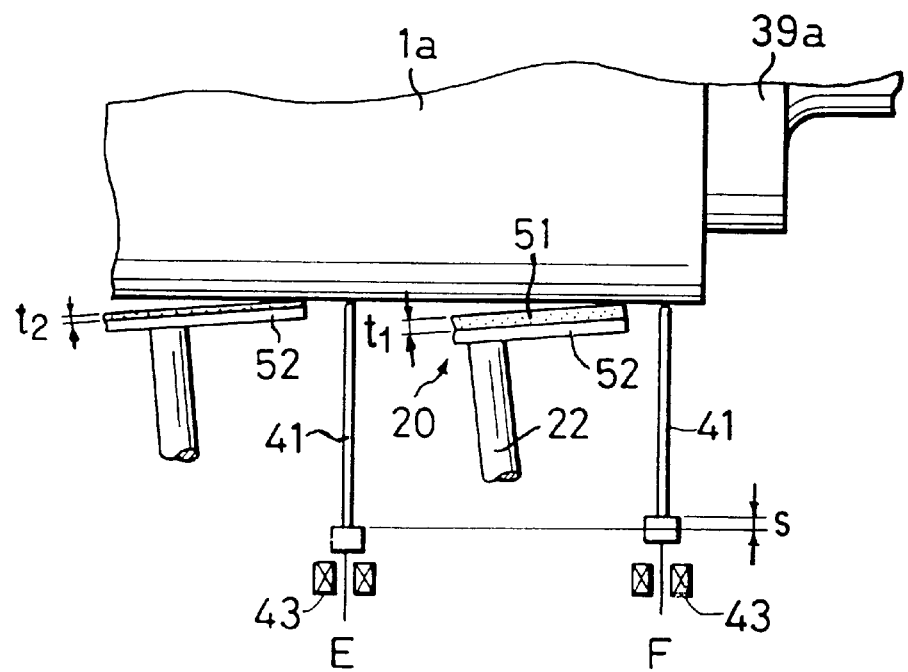
FIG. 28 is a representation for explaining a method of measuring a wear of abrasives in the fourth embodiment.
Figure 29:
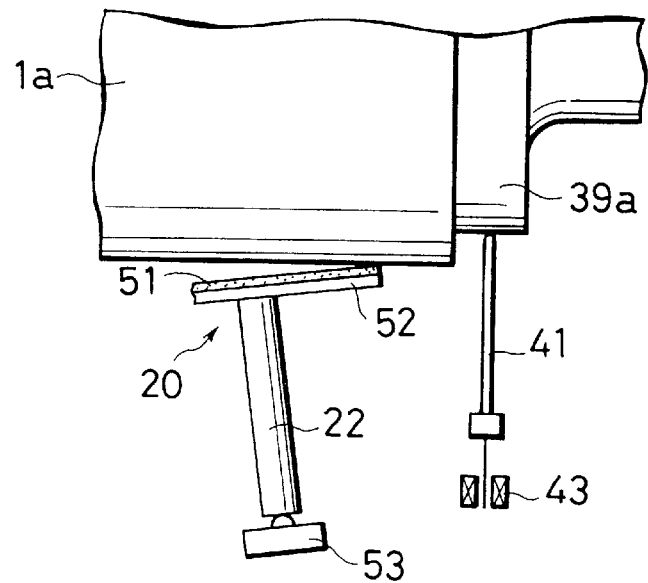
FIG. 29 is a representation for explaining a method of measuring roll eccentricity in the fourth embodiment.
Figure 30:
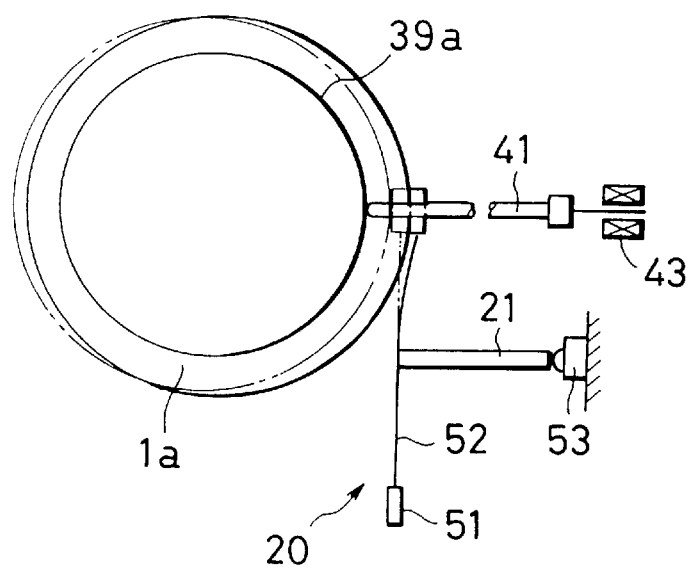
FIG. 30 is a representation for explaining the method of measuring a wear of abrasives in the fourth embodiment.

A description will now be given of a method of measuring a diameter of the work roll by the roll periphery difference measuring device 40 with reference to FIG. 27. In FIG. 27, the grinding head unit 5 is moved in the roll axial direction so that the measuring rod 41 takes a position A, followed by stopping there. Then, at the position A, a liquid pressure is introduced to the liquid pressure chamber 46, causing the measuring rod 41 to contact the reference small-diameter zone 39a of the work roll 1a. The position of the measuring rod 41 at that time is measured by the displacement meter 43. Subsequently, the grinding head unit 5 is moved to a position B, the measuring rod 41 is pressed again into contact with the work roll 1a, and the position of the measuring rod 41 at that time is measured by the displacement meter 43. A difference between the values measured by the displacement meter 43 at the positions A, B is calculated by the computer 13c (see FIG. 7), thereby determining a roll periphery difference. Given the roll periphery difference being x, the diameter D of the work roll 1a is expressed by D=D1+2x. More precisely, the diameter D of the work roll 1a is measured as follows. By making a half turn of the work roll 1a, the periphery differences are measured at opposite sides angularly spaced 180 degrees from each other, the measured values being assumed to be x1, x2, respectively. In this case, the diameter D of the work roll 1a is expressed by D=D1+x1+x2. From the diameters of the upper and lower work rolls thus obtained, there can be determined a diameter difference therebetween.

A description will now be given of a method of measuring cylindricity of the work roll 1a using the roll periphery difference measuring device 40.

As shown in FIG. 27, reference small-diameter zones 39a, 39b having been subjected to measurement are formed at both ends of the work roll 1a. On the side of the reference small-diameter zone 39a, the displacement of the measuring rod 31 is measured at each of the positions A, B, as explained above, thereby determining a diameter difference x between the reference small-diameter zone 39a and the work roll 1a. On the side of the reference small-diameter zone 39b, likewise, another grinding head unit 5 is moved to measure the displacement of the measuring rod 31 at each of positions C, D, thereby determining a diameter difference y between the reference small-diameter zone 39b and the work roll 1a. From these two diameter differences x and y, a deviation x−y therebetween is determined. This deviation of the diameter difference is divided by the distance between the two measuring points to obtain cylindricity. The cylindricity thus obtained can be used for compensating the inclination of the axis of the work roll 1a in the above-mentioned measurement using the roll profile meter.

The roll periphery difference measuring device 40 can also be used to measure a wear of the abrasive layer 51 for indicating exchange information of the abrasive layer 51. A method of measuring a wear of the abrasive layer 51 will now be described with reference to FIG. 28.

First, after attaching a fresh grinding wheel 20 to the rolling mill, the abrasive layer 51 is pressed by a grinding wheel movement device 23 against the work roll 1a under a predetermined force as indicated at a position F. The distance from the grinding head unit 5 to the work roll 1a at that time is measured by the displacement meter 43 and stored in the computer 13c (see FIG. 7). After grinding the work roll for a certain period of time, the measurement is performed in a like manner to the above as indicated at a position E, thereby obtaining the measured value of the displacement meter 43. By determining a difference s between the previous measured value and the current measured value, the resulting difference s provides the amount by which the grinding wheel 20 has been worn away during the period of time between the two measurements. Assuming that the abrasive layer 51 has a thickness t1 of its abrasive portion, the remaining thickness t2 of the abrasive portion is expressed by t2=t1−s. Thus, the exchange information of the abrasive layer 51 can be indicated based on the value of t2.

Then, after grinding the work roll 1a, whether the work roll is eccentric or not can be measured by using the roll periphery difference measuring device 40. This method of measuring an eccentricity will now be described with reference to FIGS. 29 and 30.

The measuring rod 41 is pressed against the reference small-diameter zone 39a of the work roll 1a to measure a displacement of the work roll 1a and, at the same time, the grinding wheel 20 is pressed against the work roll 1a to measure a displacement of the work roll 1a. If the work roll is not eccentric, there produces a displacement due to entire vibratory movement of the work roll, but the reference small-diameter zone 39a and the zone which has been subjected to the grinding, i.e., the roll barrel, are displaced similarly, meaning that the displacement measured by the displacement meter 43 becomes equal to the displacement determined from the load detected by the load cell 53 and the spring constant of the grinding wheel 20. However, if the work roll is eccentric, there produces a difference between the two measured displacements during one rotation of the work roll. This displacement difference can be regarded as the eccentricity of the work roll.

Fifth Embodiment

A fifth embodiment of the present invention will be described with reference to FIGS. 31 to 32 and FIG. 7. This embodiment is intended to measure a diameter of the work roll 1a without using any displacement meter.

Figure 31:
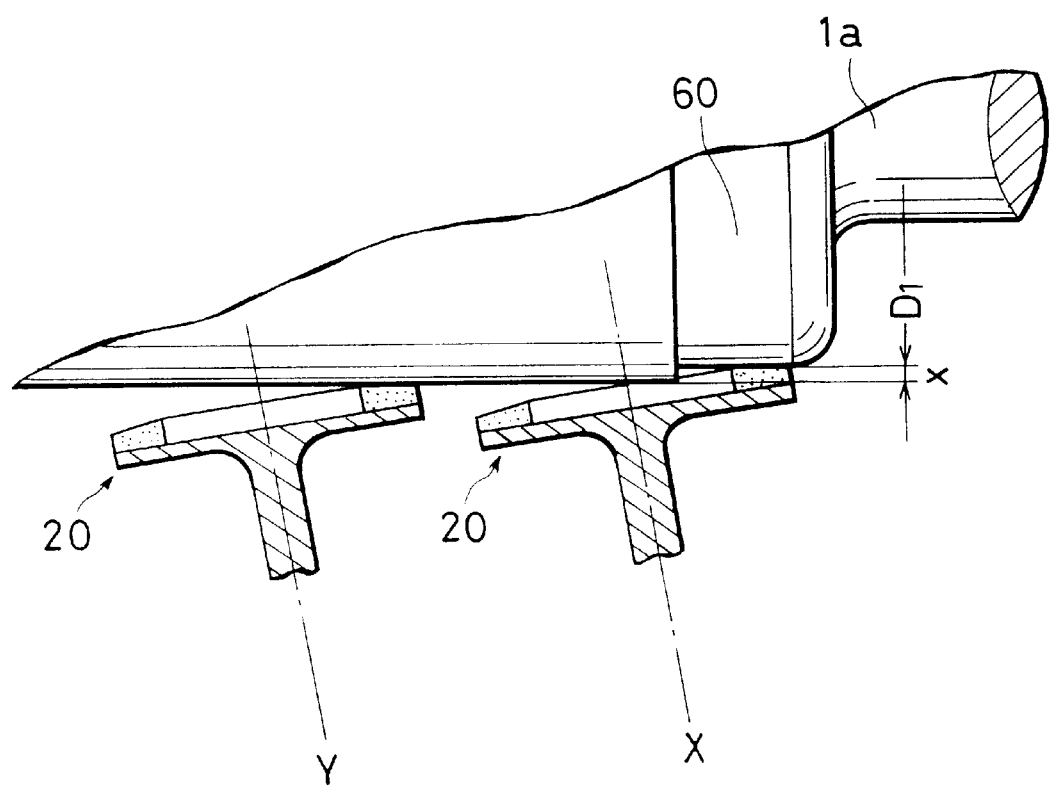
FIG. 31 is a representation for explaining a method of measuring a periphery difference in a rolling mill equipped with an on-line roll grinding system according to a fifth embodiment of the present invention.

First, as shown in FIG. 31, a reference small-diameter zone 60 is formed at one end of the work roll 1a beforehand. The reference small-diameter zone 60 can be formed by grinding one end of the work roll 1a by an off-line grinder so as to provide a diameter smaller x than the roll diameter of the zone which will be ground by the on-line grinding system (i.e., the roll barrel). The process described so far is the same as that in the above fourth embodiment. Then, a roll diameter D1 in the reference small-diameter zone 60 is measured and input to the computer 13c. The periphery difference x between the roll barrel and the reference small-diameter zone is preferably about 1 mm, though this value depends on an inclination of the grinding wheel 20 with respect to the work roll 1a.

Figure 32:
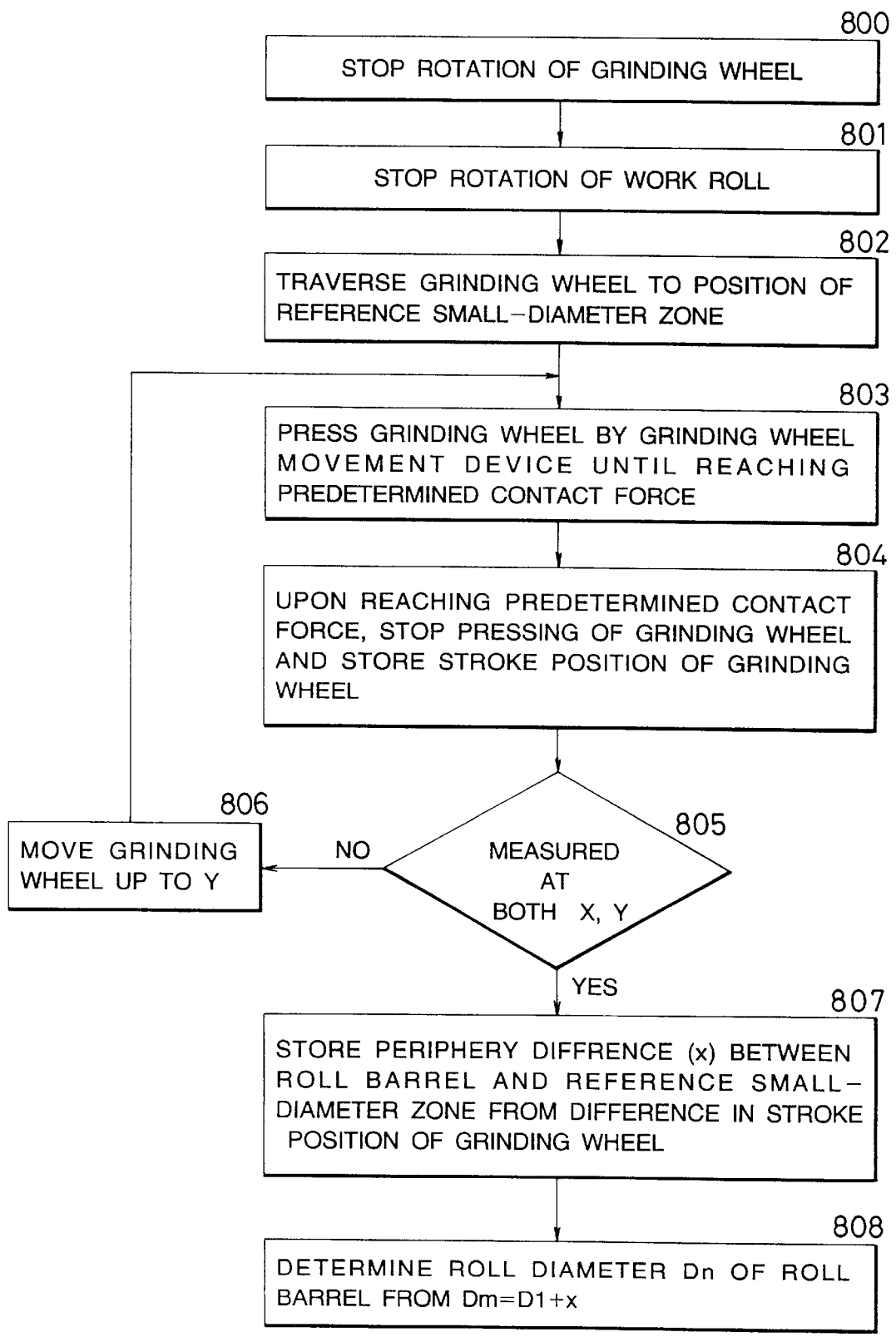
FIG. 32 is a flowchart showing procedures for practicing the method of measuring a periphery difference in the fifth embodiment.

Then, control procedures shown in FIG. 32 are executed. These control procedures are previously stored in the form of programs in the computer 13c. First, rotation of the work roll 1a and rotation of the grinding wheel 20 are both stopped to keep the reference small-diameter zone 60 from being ground by the grinding wheel (steps 800 and 801). The grinding wheel 20 is traversed to a position X of the reference small-diameter zone 60 (step 802), and then the grinding wheel 20 is moved by the grinding wheel movement device 23 so as to contact the work roll 1a. The grinding wheel 20 is further pressed against the work roll 1a until the contact force therebetween reaches a predetermined value (step 802). When the load cell 53 detects that the predetermined contact force has been reached, the movement motor 57 is stopped, following which the position of the grinding wheel at that time is detected by the encoder 57a and stored (step 804).

Thereafter, it is determined whether the measurement has been made at both the position X of the reference small-diameter zone 60 and a position Y of the roll barrel (step 805). If not, then the grinding wheel 20 is traversed to the position Y of the roll barrel (step 806). At the position Y, as with the case of the reference small-diameter zone 60, the grinding wheel 20 is pressed against the work roll 1a until the contact force therebetween reaches a predetermined value (step 803). When the predetermined contact force is reached, the position of the grinding wheel 20 at that time is detected by the encoder 57a and stored (step 804).

Subsequently, a difference between the stroke positions of the grinding wheel 20 measured at the positions A and B is calculated (step 807). This difference provides the periphery difference x. Finally, since the roll diameter D1 in the reference small-diameter zone 60 is known, a roll diameter Dn of the roll barrel is determined from the following formula (step 808).

$$Dn=D1+x$$

In that way, the diameter of the work roll 1a after the grinding can be easily determined and used for judging the timing of roll exchange or confirming the difference in diameter between the upper and lower work rolls.

Sixth Embodiment

Figure 33:
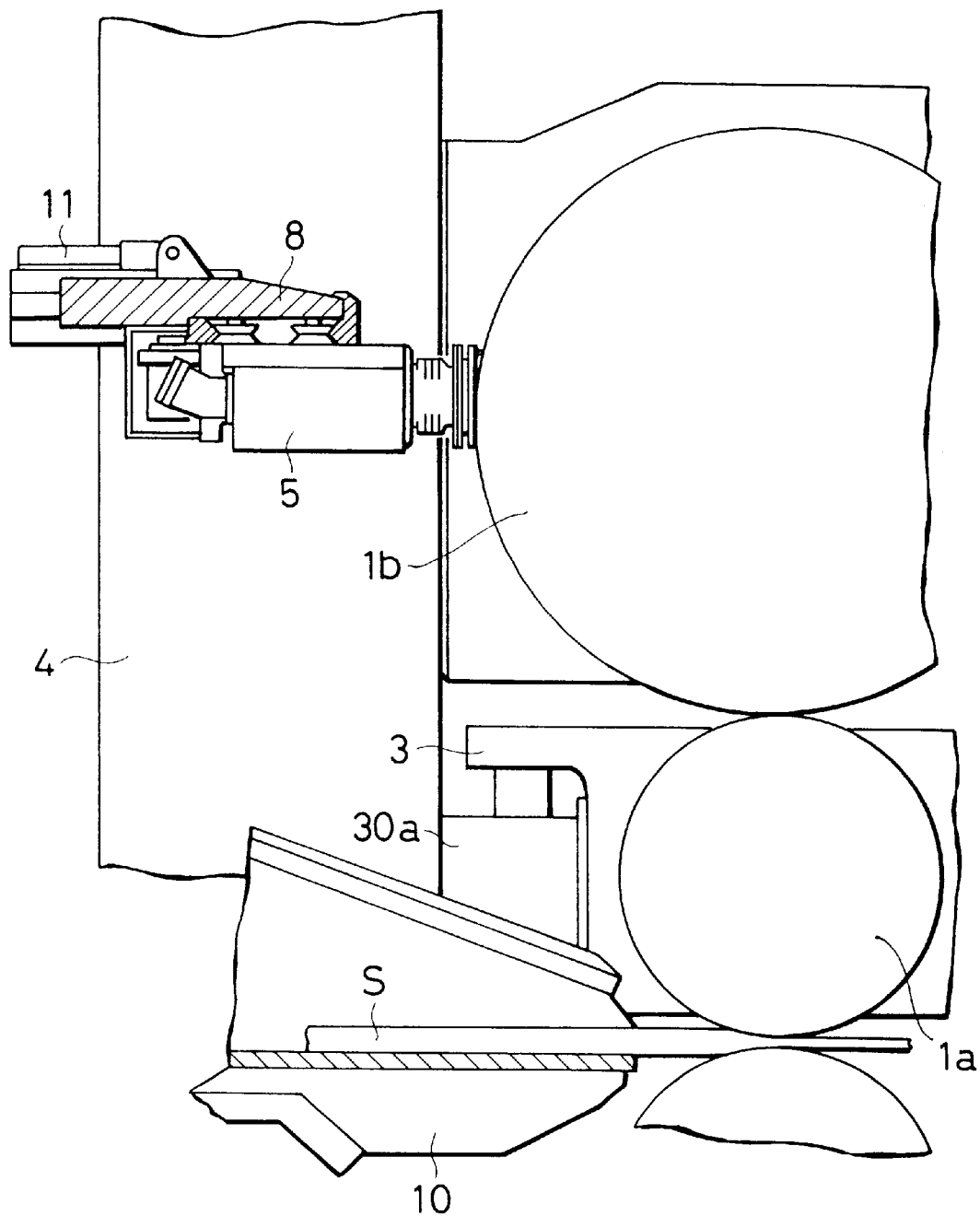
FIG. 33 is a side view, partially sectioned, of principal parts of a rolling mill equipped with an on-line roll grinding system according to a sixth embodiment of the present invention.

While the above description has been made in connection with on-line grinding of the mill roll 1a, i.e., the work roll, the rolling mill also includes the upper and lower backup rolls 1b, 1b contacting the work rolls, the surfaces of the backup rolls being also roughed and subjected to formation of a fatigue layer. FIG. 33 shows an embodiment in which an on-line roll grinding system is provided on each of the upper and lower backup rolls 1b, 1b. The on-line roll grinding system for the backup roll basically has the same construction and functions as those of the foregoing on-line roll grinding system for the work roll. By providing the on-line roll grinding systems for the backup rolls so that the surfaces of the upper and lower backup rolls 1b, 1b are ground on-line as with the surfaces of the work rolls 1a, 1a, it is possible to prolong the exchange pitch of the upper and lower backup rolls 1b, 1b and improve productivity of hot rolling facilities.

Summary of Advantages

According to the present invention, as fully described above, since the vibration of each mill roll is absorbed by an elastically deforming function of the plain wheel of the grinding wheel, the mill roll can be precisely ground with high surface roughness without causing any chattering marks and resonance.

Since the abrasive layer of the grinding wheel is formed of super abrasive grains, the movable mass of the grinding wheel can be reduced, which is more effective in preventing resonance. Also, the service life of the grinding wheel can be prolonged to grind the mill roll for a longer period of time while rolling a strip or the like. It is hence possible to greatly reduce the exchange pitch and increase productivity of rolling facilities to a large extent.

Since the grinding rate of the grinding wheel per unit time is changed by varying the contact force between the mill roll and the grinding wheel, the mill roll can be ground into an optional roll profile.

Since the grinding wheel movement device is constituted by using a ball screw mechanism or a gear mechanism which has a small backlash, the spring constant of the movement device is so increased as to prevent chattering marks caused by the backlash of the movement device.

Since at least two grinding head units capable of grinding independently of each other are disposed for one mill roll, the roll profile free from a periphery difference can be maintained over the entire length of the mill roll.

Since the grinding overlap zone produced on the mill roll by using the plural grinding wheels is distributed, precision grinding is enabled without grinding errors.

Since the mill roll is ground by using units corresponding to both roll ends and having their spindles which are inclined in opposite directions, it is possible to grind the entire length of the mill roll without interfering with the stand.

Since the contact force between the mill roll and the grinding wheel is detected for calculating a profile of the mill roll, the roll profile can be measured while grinding the mill roll. By controlling the contact force of the grinding wheel or the speed of movement of the grinding wheel in the roll axial direction based on the roll profile thus measured, the mill roll can be easily provided with a target profile.

Further, by simultaneously using an on-line roll grinding system and an on-line roll profile meter so that the roll profile optimum for rolling is maintained at all times, it is possible to realize completely schedule-free rolling.

Since an error in parallelism between the direction of traverse movement of the grinding wheel and the mill roll is compensated, the more precise profile can be measured.

Since shape control means such as roll benders are controlled in accordance with the roll profile determined by the on-line roll profile meter, high-accurate strip crown control is enabled.

Since the grinding wheel grinds the mill roll while moving along the target roll profile, the profile of the mill roll can be optionally created and maintained. At this time, since an inclination of the axis of the mill roll is measured and the grinding wheel is caused to move along the target roll profile for the grinding in consideration of such an inclination of the roll axis, the correct roll profile can always be maintained even if the roll axis is inclined.

Since the grinding is carried out under a condition that the metal chocks of the mill roll are pressed against the stands or the bender blocks, the correct roll profile can always be maintained without being affected by wear of the stands and the metal chocks.

Since the reference small-diameter zone is formed at the end of the mill roll and a periphery difference between the reference small-diameter zone and the zone of the mill roll subjected to grinding (i.e., the roll barrel) is measured by a displacement meter or the grinding head unit itself, it is possible to determine the correct roll diameter at all times and monitor a difference in diameter between the upper and lower rolls on-line. It is also possible to confirm cylindricity of the mill roll.

Finally, since the on-line roll grinding system is provided on the backup roll, a fatigue layer on the surface of the backup roll can be easily removed.

What is claimed is:

1. A grinding wheel for an on-line roll grinding system of a strip rolling mill comprising a wheel disk and an abrasive layer adhered to one side of said wheel disk at a location spaced radially outwardly of a rotational axis of said wheel disk, said wheel disk having a predetermined spring constant so as to be sufficiently elastic to allow a portion of the wheel disk contacting a rolling mill roll being ground to elastically bend about said axis and function by itself as an elastic body which is sufficiently elastic to absorb vibration from a mill roll being around during grinding of said mill roll, wherein said wheel disk has a spring constant of 1000 Kgf/mm to 30 Kgf/mm.

2. A grinding wheel for an on-line roll grinding system of a strip rolling mill comprising a wheel disk and an abrasive layer adhered to one side of said wheel disk at a location spaced radially outwardly of a rotational axis of said wheel disk, said wheel disk having a predetermined spring constant so as to be sufficiently elastic to allow a portion of the wheel disk contacting a rolling mill roll being around to elastically bend about said axis and function by itself as an elastic body which is sufficiently elastic to absorb vibration from a mill roll being around during grinding of said mill roll, wherein said wheel disk has a spring constant of 500 Kgf/mm to 50 Kgf/mm.

3. A grinding wheel for an on-line roll grinding system according to claim 1, wherein said abrasive layer contains cubic boron nitride abrasives, said abrasives having a concentration of 50 to 100 and a grain size of 80 to 180, and a resin bond is used as a binder for said abrasives.

4. A rolling mill assembly comprising:
   a grinding wheel positioned to face and grind a mill roll during rolling operations of a rolling mill, and
   a measuring system for measuring at least one of mill roll contact forces on said grinding wheel and grinding wheel position when grinding said mill roll and for providing a roll profile sensing signal defendant on said at least one of said mill roll contact force and said grinding wheel position, whereby said grinding wheel functions as a roll profile sensor.

5. A rolling mill assembly according to claim 4, comprising a roll bender controlled as a function of the roll profile sensed by the grinding wheel.

6. A rolling mill assembly according to claim 4, comprising a roll shifter controlled as a function of the roll profile sensed by the grinding wheel.

7. A rolling mill assembly according to claim 4, comprising a roll crosser controlled as a function of the roll profile sensed by the grinding wheel.

8. A rolling method comprising:
   rolling material by compressing the material against a mill roll,
   utilizing a grinding wheel to face and grind the mill roll during rolling operations of a rolling mill, and
   sensing a profile of said mill roll being ground utilizing the grinding wheel as a roll profile sensor by measuring at least one of mill roll contact forces on said grinding wheel and a position of said grinding wheel during rolling operations.

9. A rolling method according to claim 8, comprising controlling a roll bender as a function of the roll profile sensed by the grinding wheel.

10. A rolling method according to claim 8, comprising controlling a roll shifter as a function of the roll profile sensed by the grinding wheel.

11. A rolling method according to claim 8, comprising controlling a roll crosser as a function of the roll profile sensed by the grinding wheel.

12. A grinding wheel for an on-line roll grinding system comprising a wheel disk and an abrasive layer adhered to one side of said wheel disk, said wheel disk being configured to elastically bend to absorb vibration from said mill roll being ground during grinding of said mill roll, and
   wherein said wheel has a spring constant of 1000 Kgf/mm to 30 Kgf/mm.

13. A grinding wheel according to claim 12, wherein said wheel disk has a spring constant of 500 Kgf/mm to 50 Kgf/mm.

14. A grinding wheel according to claim 12, wherein said abrasive layer contains cubic boron nitride abrasives, said abrasives having a concentration of 50 to 100 and a grain size of 80 to 180, and a resin bond is used as a binder for said abrasives.

* * * * *